(12) United States Patent
Midorikawa et al.

(10) Patent No.: US 12,439,009 B2
(45) Date of Patent: Oct. 7, 2025

(54) IMAGE PROJECTOR INCLUDING A PROJECTING SECTION, A SUPPORT SECTION, AND AN EXTERIOR SECTION

(71) Applicants: Ruki Midorikawa, Kanagawa (JP); Tomoko Takahashi, Kanagawa (JP); Yu Yoneda, Kanagawa (JP)

(72) Inventors: Ruki Midorikawa, Kanagawa (JP); Tomoko Takahashi, Kanagawa (JP); Yu Yoneda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 742 days.

(21) Appl. No.: 17/732,594

(22) Filed: Apr. 29, 2022

(65) Prior Publication Data

US 2022/0368869 A1 Nov. 17, 2022

(30) Foreign Application Priority Data

May 14, 2021 (JP) ................................. 2021-082818

(51) Int. Cl.
| | |
|---|---|
| *H04N 9/31* | (2006.01) |
| *G03B 21/14* | (2006.01) |
| *G03B 21/16* | (2006.01) |
| *H05K 7/20* | (2006.01) |

(52) U.S. Cl.
CPC ......... *H04N 9/3144* (2013.01); *G03B 21/145* (2013.01); *G03B 21/16* (2013.01); *H05K 7/20418* (2013.01); *H04N 9/3173* (2013.01)

(58) Field of Classification Search
CPC .. H04N 9/3144; H04N 9/3173; H04N 9/3155; G03B 21/145; G03B 21/16
See application file for complete search history.

(56) References Cited

U.S. PATENT DOCUMENTS

| | | | | |
|---|---|---|---|---|
| 9,383,636 | B2* | 7/2016 | Liu | ............. G03B 21/16 |
| 2007/0177115 | A1* | 8/2007 | Yin | ............. G03B 29/00 |
| | | | | 353/122 |
| 2009/0033880 | A1* | 2/2009 | Heo | ............. G03B 21/56 |
| | | | | 353/52 |

(Continued)

FOREIGN PATENT DOCUMENTS

| | | |
|---|---|---|
| JP | 2006-072216 | 3/2006 |
| JP | 2008-090163 | 4/2008 |

(Continued)

*Primary Examiner* — Bao-Luan Q Le
(74) *Attorney, Agent, or Firm* — XSENSUS LLP

(57) ABSTRACT

An image projector includes a projecting section, a support section, an exterior section, a first heat conductor, and a second heat conductor. The projecting section projects an image, and includes an image forming section that forms the image. The support section supports the projecting section, and includes a projecting section placement face on which the projecting section is disposed. The exterior section covers the projecting section and the support section. The first heat conductor is disposed between the projecting section and the support section. The second heat conductor is disposed between the support section and the exterior section. The first heat conductor is disposed so as to at least partially overlap the image forming section in a plan view of the projecting section placement face.

20 Claims, 31 Drawing Sheets

(56) References Cited

U.S. PATENT DOCUMENTS

| | | | | |
|---|---|---|---|---|
| 2010/0141899 | A1* | 6/2010 | Chien | G03B 21/145 353/43 |
| 2011/0279783 | A1* | 11/2011 | Chang | G03B 21/28 353/99 |
| 2011/0304829 | A1* | 12/2011 | Enomoto | H04N 9/3161 353/31 |
| 2012/0057136 | A1* | 3/2012 | Enomoto | H04N 9/3129 353/61 |
| 2012/0057137 | A1* | 3/2012 | Enomoto | H04N 9/3161 353/119 |
| 2012/0134149 | A1* | 5/2012 | Enomoto | G03B 21/2033 362/231 |
| 2012/0182527 | A1* | 7/2012 | Enomoto | H04N 9/3161 353/31 |
| 2012/0229781 | A1* | 9/2012 | Jikuya | G03B 21/2033 353/119 |
| 2012/0307212 | A1* | 12/2012 | Enomoto | G03B 21/2033 353/52 |
| 2013/0057835 | A1* | 3/2013 | Reis | H05K 7/20445 353/52 |
| 2013/0303238 | A1* | 11/2013 | Huang | H04N 9/3173 348/E5.143 |
| 2018/0005917 | A1* | 1/2018 | Tang | H01L 23/49811 |
| 2021/0127097 | A1 | 4/2021 | Takahashi et al. | |

FOREIGN PATENT DOCUMENTS

| | | |
|---|---|---|
| JP | 2009-156912 | 7/2009 |
| JP | 2021-101232 | 7/2021 |
| JP | 2021-101233 | 7/2021 |
| WO | WO2011/106771 A1 | 9/2011 |

* cited by examiner

IMAGE PROJECTOR INCLUDING A PROJECTING SECTION, A SUPPORT SECTION, AND AN EXTERIOR SECTION

CROSS-REFERENCE TO RELATED APPLICATION

This patent application is based on and claims priority pursuant to 35 U.S.C. § 119(a) to Japanese Patent Application No. 2021-082818, filed on May 14, 2021, in the Japan Patent Office, the entire disclosure of which is hereby incorporated by reference herein.

BACKGROUND

Technical Field

The present invention relates to an image projector.

Description of the Related Art

There is an image projector that radiates the heat generated thereby.

In such an image projector, the heat generated by a projector module including a light source and related electronic components inside the image projector may be diffused from a heat collector to a heat spreader by heat transfer through contact.

The above-described image projector, however, diffuses the heat of the entire projector module, which serves as a projecting section that projects an image. Consequently, the image projector may fail to efficiently radiate the heat of a particular component that may act as a heat source in the projecting section.

SUMMARY

In one embodiment of this invention, there is provided an image projector that includes, for example, a projecting section, a support section, an exterior section, a first heat conductor, and a second heat conductor. The projecting section projects an image, and includes an image forming section that forms the image. The support section supports the projecting section, and includes a projecting section placement face on which the projecting section is disposed. The exterior section covers the projecting section and the support section. The first heat conductor is disposed between the projecting section and the support section. The second heat conductor is disposed between the support section and the exterior section. The first heat conductor is disposed so as to at least partially overlap the image forming section in a plan view of the projecting section placement face.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
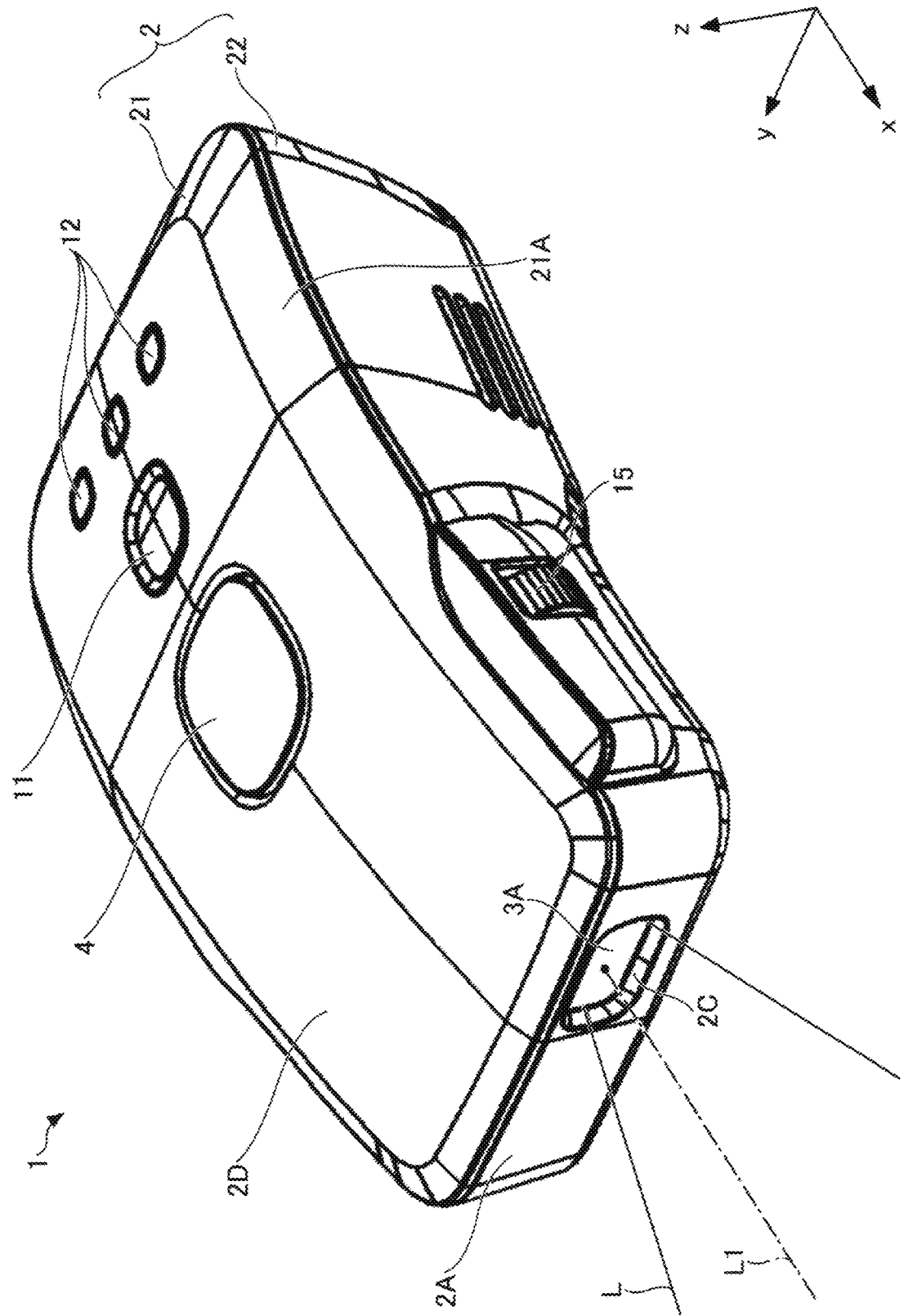
FIG. 1 is a perspective view of an image projector according to a first embodiment of the present invention, as viewed from the positive side of a z direction.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention will be described below with reference to the accompanying drawings.

In the following description, an x direction, a y direction, and a z direction are perpendicular to each other. The x direction corresponds to a projection direction of an image projector 1 according to a first embodiment of the present invention. The y direction corresponds to the lateral direction of a projected image projected by the image projector 1. The z direction corresponds to the vertical direction of the projected image projected by the image projector 1. The y direction typically corresponds to the horizontal direction, and the z direction typically corresponds to the vertical direction.

An example of the general arrangement of the image projector 1 according to the first embodiment will be described.

Figure 2:
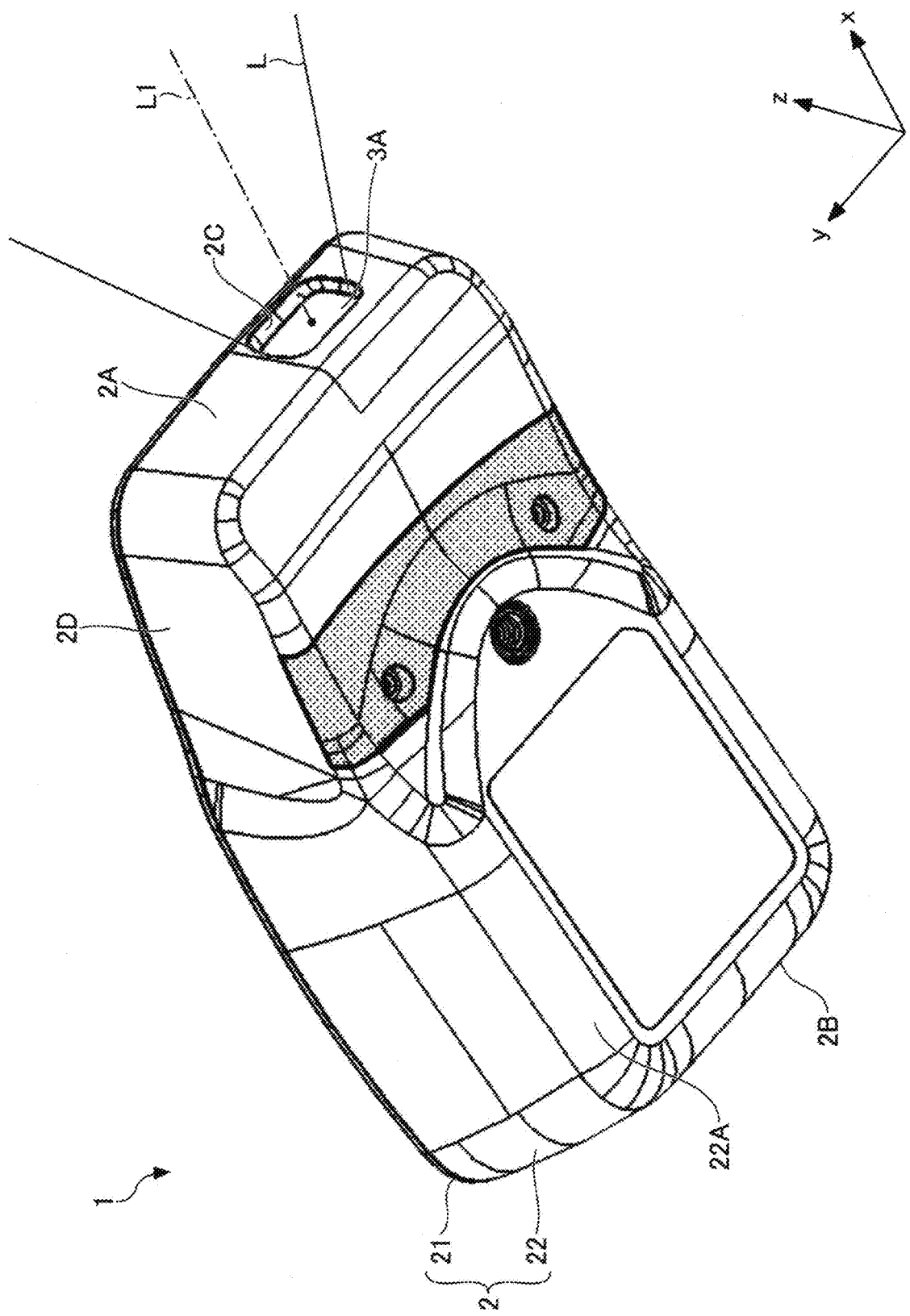
FIG. 2 is a perspective view of the image projector of the first embodiment, as viewed from the negative side of the z direction.
Figure 3:
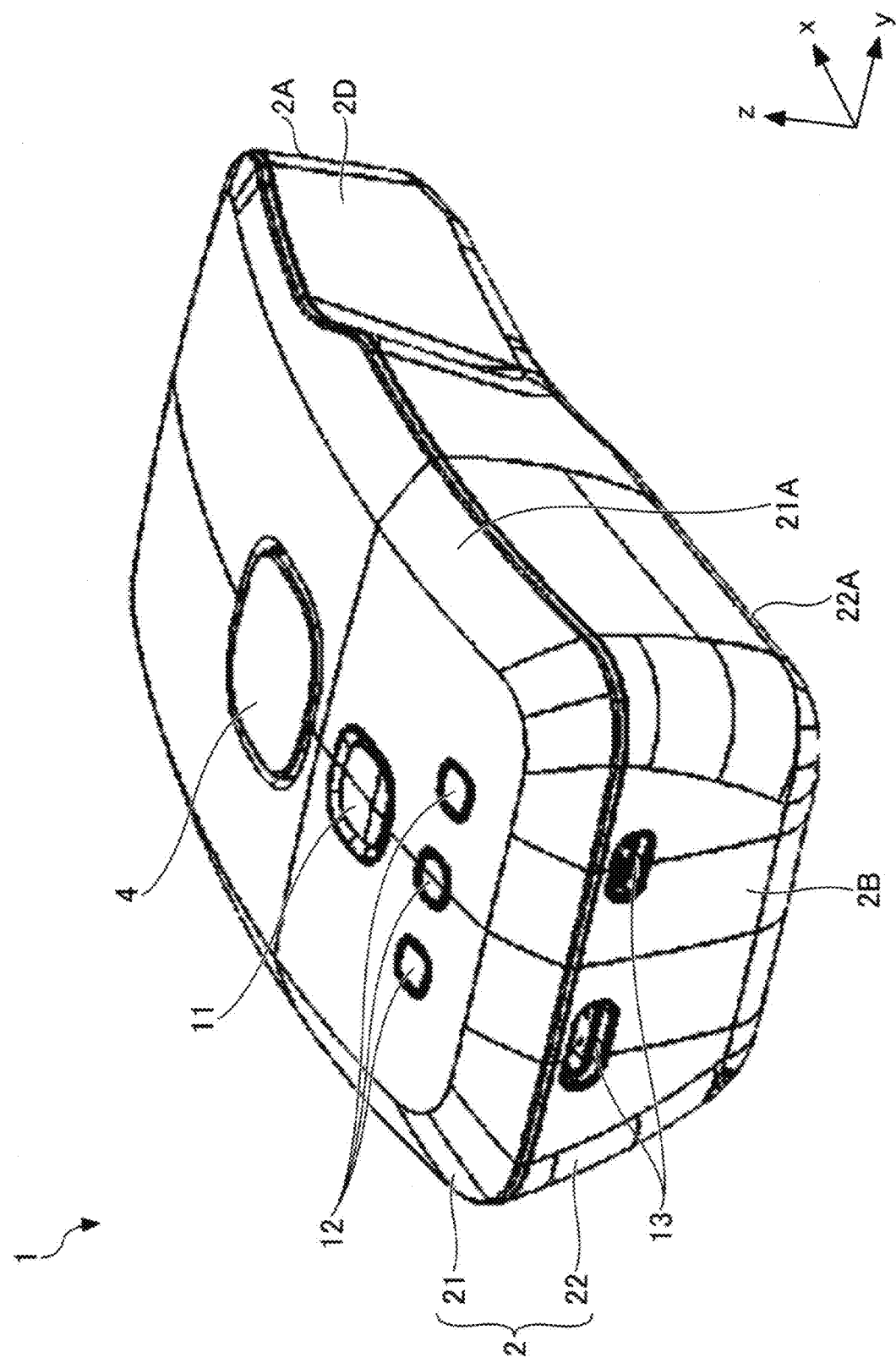
FIG. 3 is a perspective view of the image projector of the first embodiment, as viewed from the negative side of an x direction.
Figure 4:
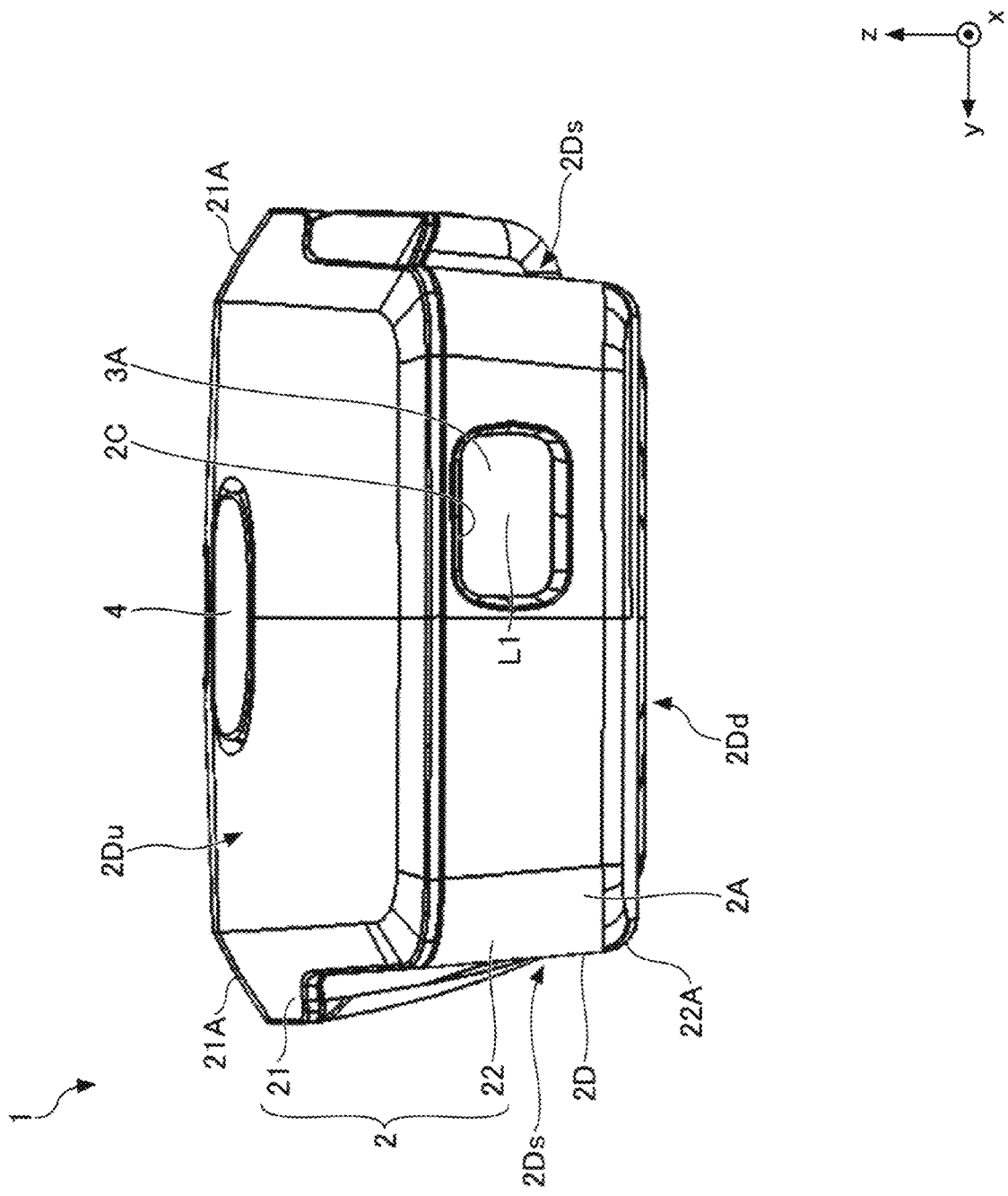
FIG. 4 is a front view of the image projector of the first embodiment, as viewed from the positive side of the x direction.
Figure 5:
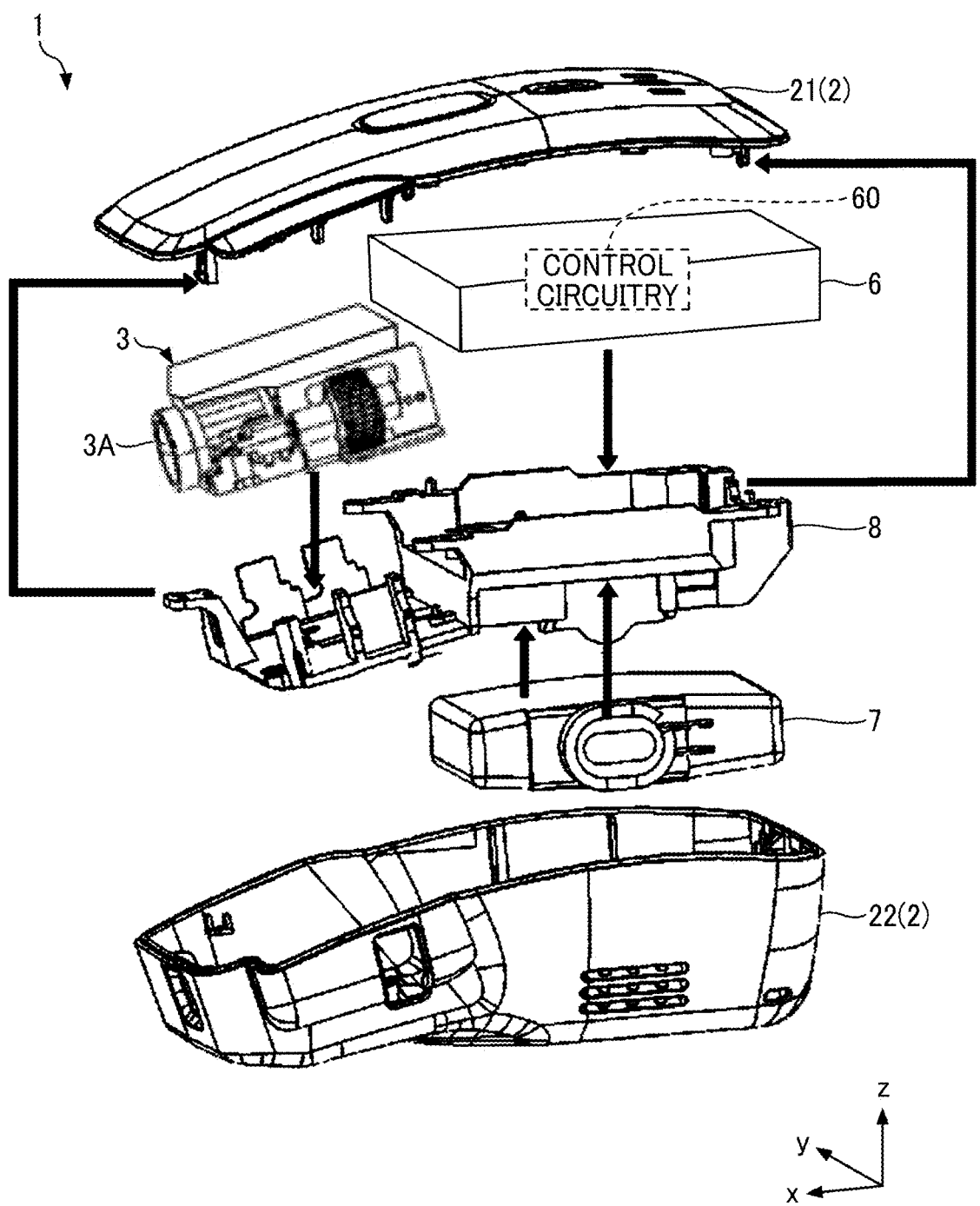
FIG. 5 is an exploded perspective view of the image projector of the first embodiment.
Figure 6:
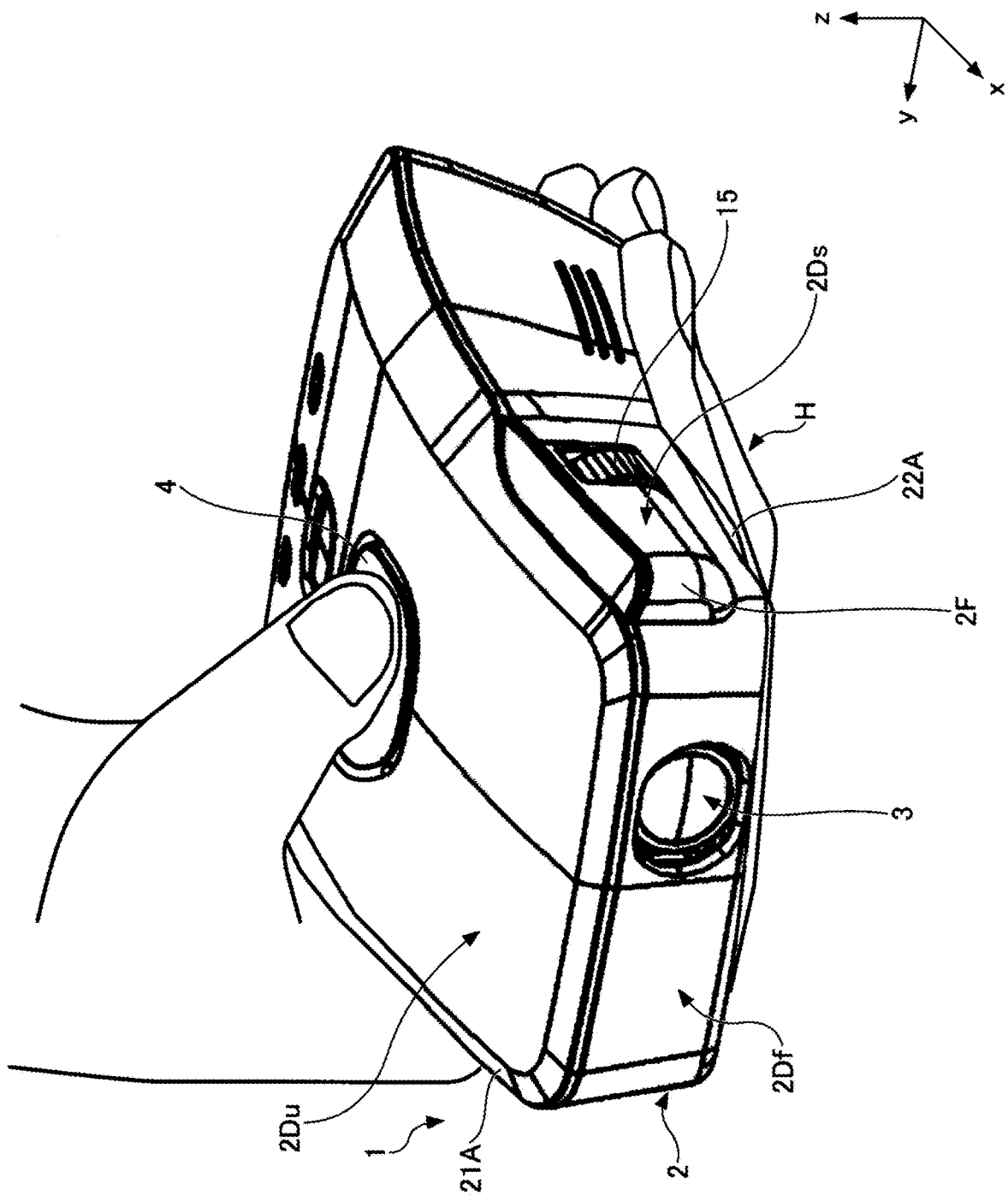
FIG. 6 is a perspective view of the image projector of the first embodiment in a hand-held state.
Figure 7:
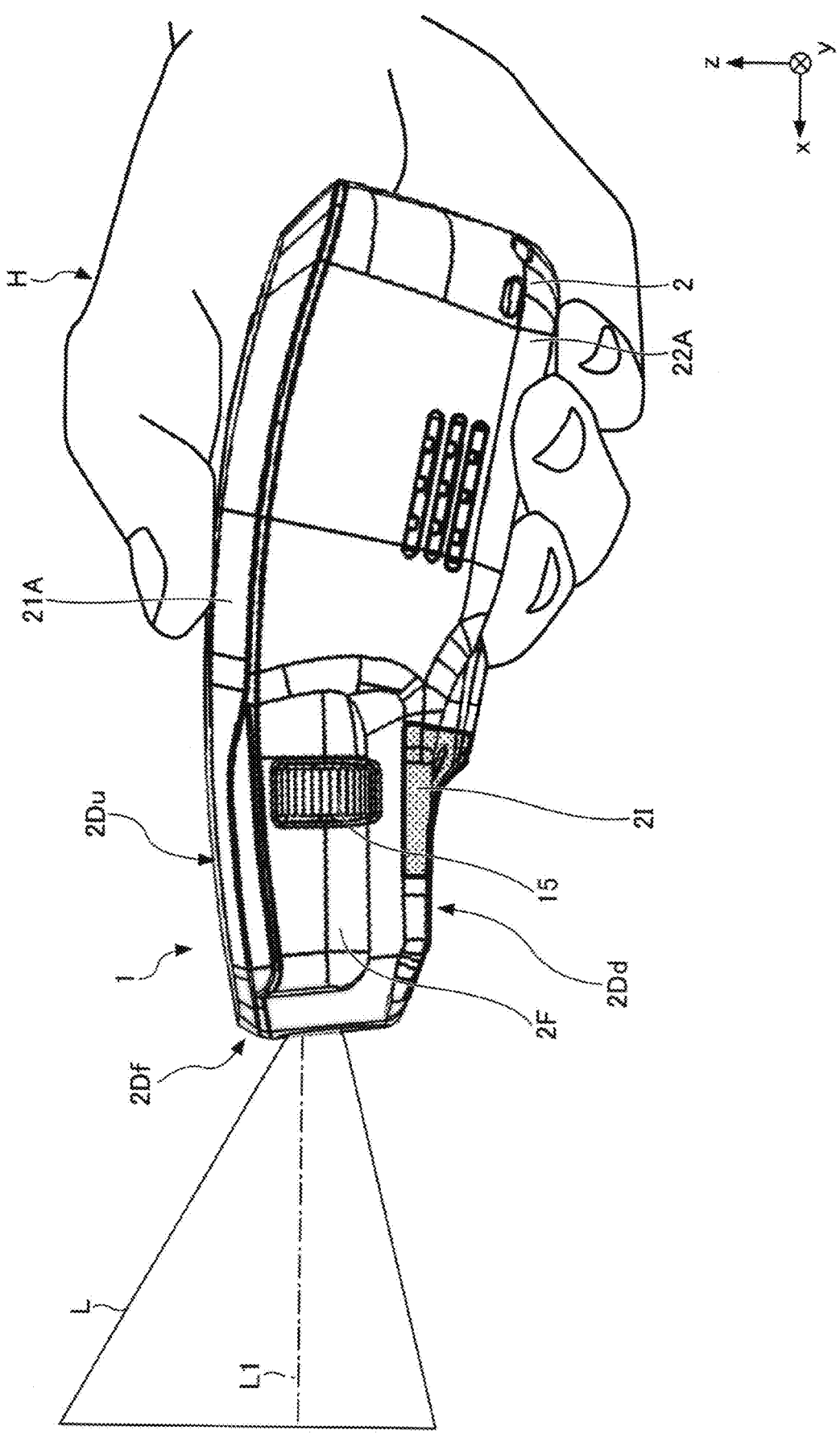
FIG. 7 is a side view of the image projector of the first embodiment in the hand-held state.

FIG. 1 is a perspective view of the image projector 1 of the first embodiment, as viewed from the positive side of the z direction. FIG. 2 is a perspective view of the image projector 1 of the first embodiment, as viewed from the negative side of the z direction. FIG. 3 is a perspective view of the image projector 1 of the first embodiment, as viewed from the negative side of the x direction. FIG. 4 is a front view of the image projector 1 of the first embodiment, as viewed from the positive side of the x direction. FIG. 5 is an exploded perspective view of the image projector 1 of the first embodiment. FIG. 6 is a perspective view of the image projector 1 of the first embodiment in a hand-held state. FIG. 7 is a side view of the image projector 1 of the first embodiment in the hand-held state.

The image projector 1 illustrated in FIGS. 1 to 7 is a hand-held image projector with which an operator of the image projector 1 (hereinafter simply referred to as the operator) is able to project an image while holding the image projector 1 with one hand.

The image projector 1 includes a projecting section 3, a support section 8, an upper cover 21, and a lower cover 22. The projecting section 3 emits light to the outside of the image projector 1 to project the image. The emitted light and the projected image will be referred to as the projected light and the projected image, respectively. The support section 8 is a member that supports the projecting section 3. Each of the upper cover 21 and the lower cover 22 is an example of an exterior section that covers the projecting section 3 and the support section 8.

The image projector 1 further includes a main body 2 formed into a shape holdable with one hand. The main body 2 includes the upper cover 21 and the lower cover 2 to house the projecting section 3 and the support section 8 in a space covered by the upper cover 21 and the lower cover 22.

The main body 2 includes a projection 2D into which a part of the space covered by the upper cover 21 and the lower cover 22 projects. The projection 2D projects along the longitudinal direction of the main body 2 (i.e., the x direction). The projection 2D is formed integrally with the main body 2; the space inside the projection 2D and the space inside the main body 2 communicate with each other. The relationship between the main body 2 and the projection 2D is understood to be that the main body 2 includes the projection 2D.

The projecting section 3 is disposed inside the projection 2D on the leading edge side of the main body 2 in the positive x direction such that the projection direction corresponds to the longitudinal direction of the main body 2 (i.e., the x direction). The projecting section 3 includes a lens section 3A. The projecting section 3 is disposed such that the lens section 3A is exposed through an opening 2C formed in a leading edge portion 2A of the projection 2D in the positive x direction. Further, the projecting section 3 is disposed inside the main body 2 such that the vertical direction of the projected image projected from the lens section 3A corresponds to the z direction, and that the lateral direction of the projected image corresponds to the y direction.

When light L is projected to the outside of the image projector 1, the axis passing through the center of a lens of the lens section 3A will be defined as the optical axis LI. The projecting section 3 includes optical elements such as the lens. The optical axis of the projecting section 3 corresponds to the center of the optical axis of the optical elements, for example. The projection 2D is understood to project along the optical axis of the projecting section 3.

As illustrated in FIGS. 4, 6, and 7, for example, the projection 2D includes an upper portion 2Du, a lower portion 2Dd, side surface portions 2Ds, and a front portion 2Df. The upper portion 2Du is an example of a first portion. The lower portion 2Dd is an example of a second portion facing the upper portion 2Du. Each of the side surface portions 2Ds and the front portion 2Df is an example of a third portion intersecting each of the upper portion 2Du and the lower portion 2Dd. The upper portion 2Du refers to a portion of the upper cover 21 on the positive side of the z direction. The lower portion 2Dd refers to a portion of the lower cover 22 on the negative side of the z direction. The side surface portions 2Ds refer to a portion of the lower cover 22 on the positive side of the y direction and a portion of the lower cover 22 on the negative side of they direction. The front portion 2Df refers to a portion of the lower cover 22 on the positive side of the x direction. The front portion 2Df is understood to be a leading edge portion of the lower cover 22 in the projection direction of the projected image.

FIGS. 6 and 7 illustrate the image projector 1 held with a hand H of the operator. The projecting section 3 includes a dial 15 for adjusting the focus. The dial 15 is exposed to the outside of the image projector 1 through an opening formed in a part of the projection 2D. The operator operates the dial 15 to adjust the focus of the projected image.

An internal structure of the image projector 1 will be described with FIG. 5.

As illustrated in FIG. 5, the image projector 1 includes a control board 6 and a battery 7 inside the main body 2. Each of the control board 6 and the battery 7 has an approximately rectangular shape. The control board 6 is an example of a control board including control circuitry 60.

The control circuitry 60 controls overall operation of the image projector 1 including operation of the projecting section 3. The control circuitry 60 may be physically implemented as a computer system in which components such as a central processing unit (CPU), a random access memory (RAM), a read only memory (ROM), a storage device, and an interface are connected to each other via a bus. Various functions of the control circuitry 60 are implemented by reading particular computer software into hardware such as the CPU or RAM, thereby writing and read data to and from the RAM or storage device under the control of the CPU and operating other components such as the projecting section 3 and an external device via the interface.

The battery 7 is a plate-shaped secondary battery serving as a power supply that supplies power to the projecting section 3 and the control circuitry 60.

As illustrated in FIG. 5, the projecting section 3, the control board 6, and the battery 7 are attached to the upper cover 21 of the main body 2 while being integrally fixed to the support section 8.

With this configuration, the projecting section 3, the control board 6, and the battery 7 are pressed against and fixed to the support section 8 to be supported by the support section 8. Thereby, the projecting section 3, the control board 6, and the battery 7 are attachable to and removable from the upper cover 21 of the main body 2 in the vertical direction (i.e., the z direction). Further, with the lower cover 22 removed from the main body 2, the image projector 1 is disassemblable with the projecting section 3, the control board 6, and the battery 7 integrally connected to the upper cover 21 via the support section 8. The projecting section 3, the control board 6, and the battery 7 are thus integrally removable, improving the maintenance performance (e.g., replacement workability). For example, the replacement of the battery 7 and the removal and maintenance work of components are facilitated.

As illustrated in FIG. 1, for example, a surface of the main body 2 on the positive side of the z direction is formed with a projection button 4 as a first button, a power button 11 as a second button, and a button set 12. The power button 11 is a button for switching on and off power supply to the image projector 1; operating the function of a main power supply of the image projector 1. The power button 11 may have another function in addition to the function of the main power supply. Further, depending on the state of the image projector 1, the power button 11 may implement another function instead of the function of the main power supply.

The button set 12 includes a plurality of buttons for operating other functions of the image projector 1. The power button 11 is positioned on the negative side in the x direction of the projection button 4. The button set 12 is positioned on the negative side in the x direction of the power button 11. The buttons of the buttons set 12 are arranged along the y direction. The button set 12 is a set of buttons. In the first embodiment, the button set 12 includes three buttons.

As illustrated in FIG. 3, an edge surface 2B of the main body 2 on the negative side of the x direction is formed to expose connectors 13, such as a universal serial bus (USB) connector and a high-definition multimedia interface (HDMI, registered trademark) connector, to the outside of the image projector 1 to make the connectors 13 connectable by wire to various external devices. The connectors 13 are formed on the control board 6, for example.

As illustrated in FIGS. 1 to 4 and FIGS. 6 and 7, the main body 2 includes an upper tapered portion 21A and a lower tapered portion 22A. The upper tapered portion 21A is a tapered portion tapered from side surfaces of the main body 2 toward an upper surface of the main body 2. The lower tapered portion 22A is a tapered portion tapered from the side surfaces of the main body 2 toward a lower surface of the main body 2 or the lower portion 2Dd of the projection 2D.

The upper tapered portion 21A and the lower tapered portion 22A thus formed on the main body 2 make it easy for the operator (i.e., user) to hold the main body 2. Further, since a hand-held projector such as the image projector 1 is typically carried in a bag or a clothing pocket, tapered portions such as the upper tapered portion 21A and the lower tapered portion 22A prevent corners of the projector from being caught in the bag or pocket when the projector is taken in or out of the bag or pocket, for example.

In the first embodiment, the upper tapered portion 21A and the lower tapered portion 22A are formed around the entire perimeter of the image projector 1, as illustrated in FIG. 1, for example. The tapered portions, however, may be formed around part of the perimeter of the image projector 1.

Figure 8:
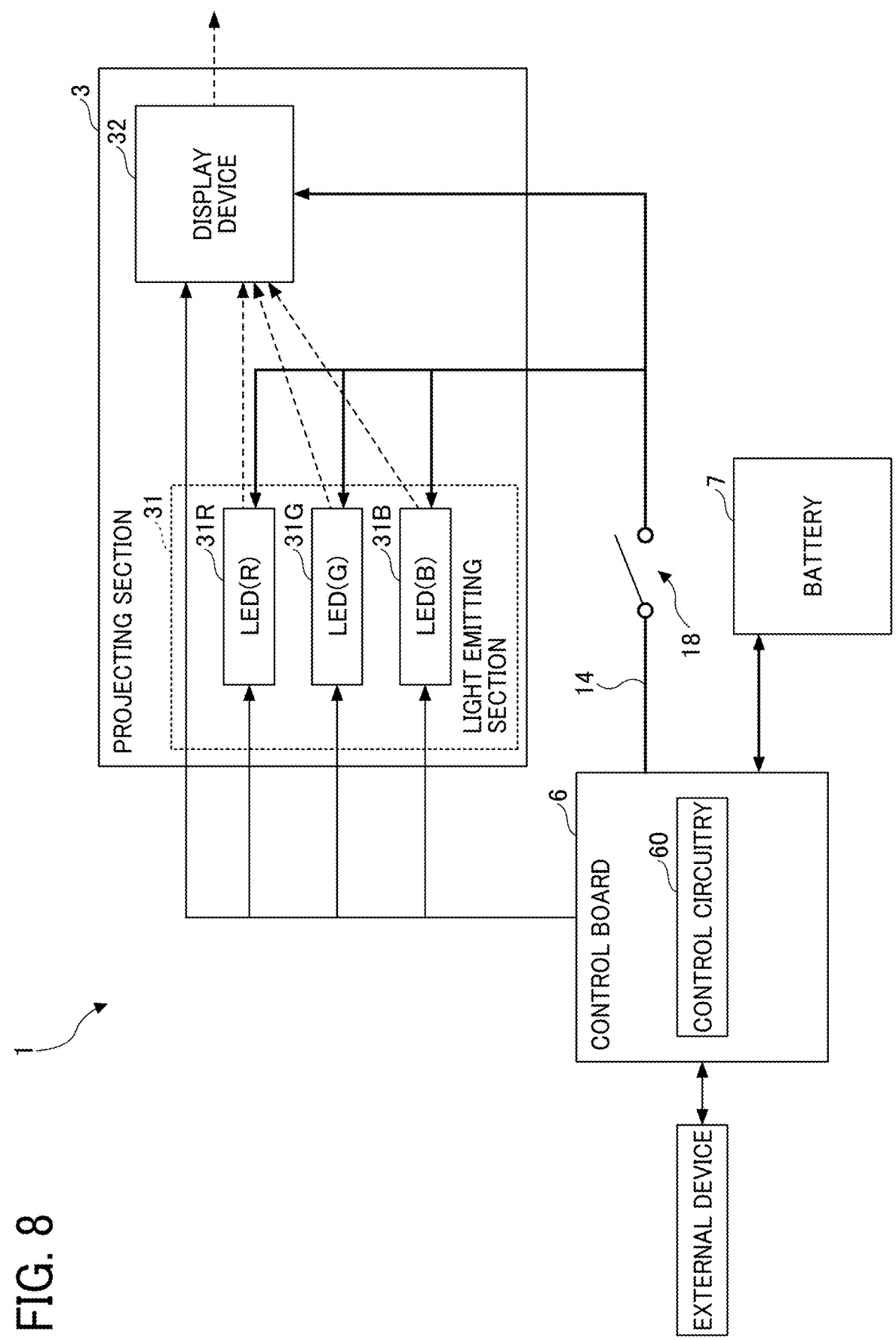
FIG. 8 is a block diagram of the image projector of the first embodiment.

FIG. 8 is a block diagram of the image projector 1. As illustrated in FIG. 8, the projecting section 3 includes a light emitting section 31 and a display device 32. The light emitting section 31 includes a light emitting diode (LED) 31R, an LED 31G, and an LED 31B. The LED 31R is a light source corresponding to the red (R) color, and the LED 31G is a light source corresponding to the green (G) color. Further, the LED 31B is a light source corresponding to the blue (B) color. The display device 32 is an example of an image forming section that forms the projected image with the light emitted from the light emitting section 31. In the first embodiment, a digital micromirror device (DMD) is used as the display device 32.

Each of the light emitting section 31 and the display device 32 may be replaced by another component capable of implementing the function of the light emitting section 31 or the display device 32. That is, the LEDs used as the light emitting section 31 may be replaced by a halogen lamp, for example. Further, the DMD used as the display device 32 may be replaced by a liquid crystal display device. The control circuitry 60 controls the light emission of the light emitting section 31 and the projected image formation of the display device 32, for example.

In FIG. 8, an information transmission system of the image projector 1 is denoted with solid lines, and a power supply system of the image projector 1 is denoted with thick solid lines. Further, an optical system of the image projector 1 is denoted with broken lines.

As illustrated in FIG. 8, in the information transmission system of the image projector 1, the control board 6 outputs control signals to the light emitting section 31 and the display device 32 of the projecting section 3. In the power supply system of the image projector 1, the battery 7 supplies power to the control board 6, which then supplies power to the light emitting section 31 and the display device 32 of the projecting section 3 via a wire 14. Particularly in the first embodiment, a switch 18 is provided on the wire 14 between the control board 6 and the projecting section 3. With the input of an operation of the projection button 4, the switch 18 switches between an on-state and an off-state. FIG. 8 illustrates the switch 18 in the off-state.

In the on-state, the switch 18 supplies power to the light emitting section 31 and the display device 32 of the projecting section 3. In the-off state, the switch 18 stops the power supply to the light emitting section 31 and the display device 32 of the projecting section 3. Irrespective of whether the switch 18 is in the on-state or in the off-state, the control board 6 is constantly supplied with power from the battery 7. In accordance with the input of the operation of the projection button 4, therefore, the switch 18 is capable of switching the projecting section 3 between a projection state and a non-projection state, i.e., turning on and off the light emitting section 31 and switching the display device 32 between an operating state and a suspended state, while keeping the control board 6 in an active state.

Figure 9:
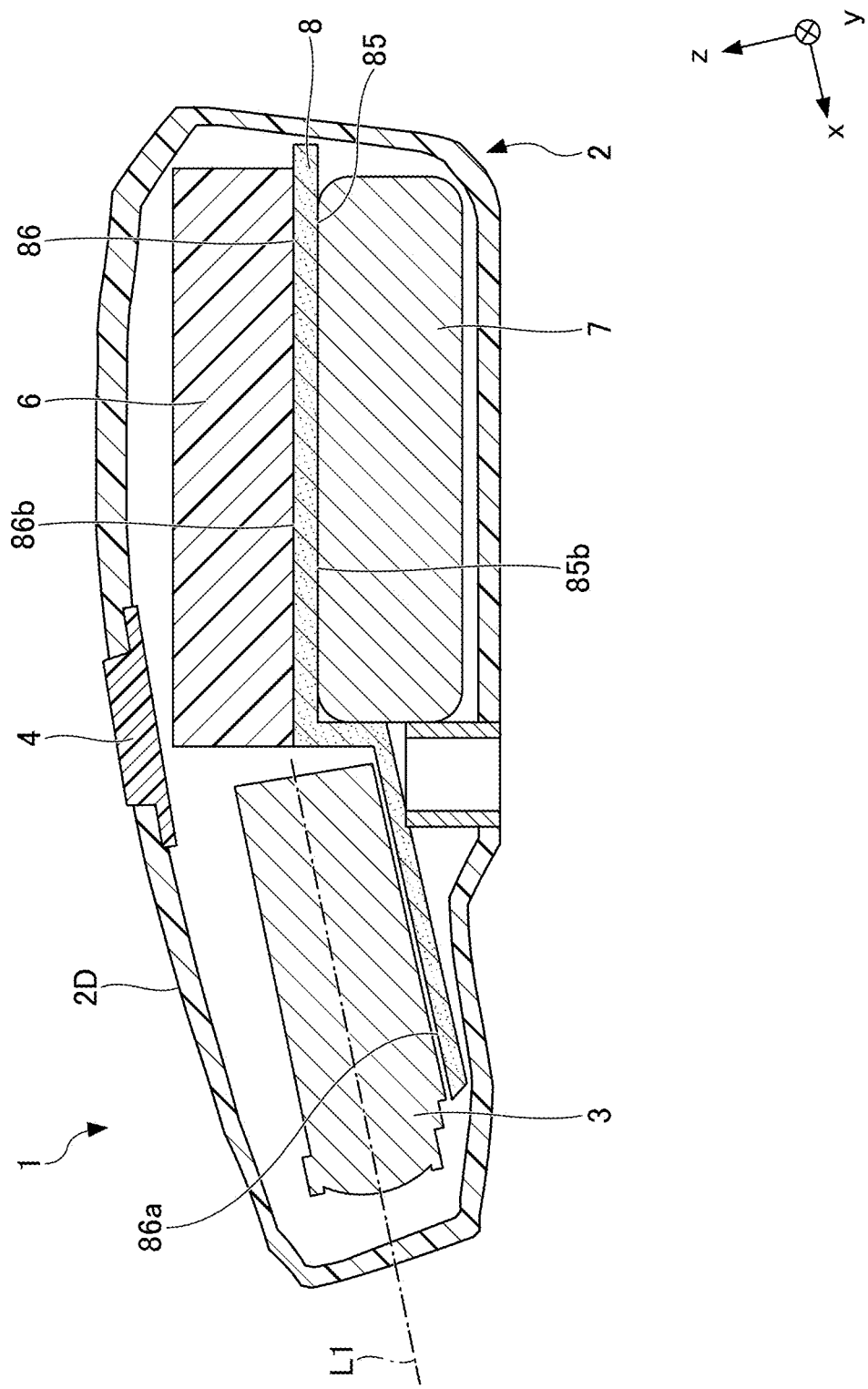
FIG. 9 is a vertical cross-sectional view of the image projector of the first embodiment.

FIG. 9 is a vertical cross-sectional view of the image projector 1. In the image projector 1, the projecting section 3, the control board 6, the battery 7, and the support section 8 housed in the main body 2 have the following relative positions. The projecting section 3 or at least a leading edge portion thereof is disposed inside the projection 2D, which projects from the main body 2 in the projection direction of the light projected by the projecting section 3 (i.e., the positive x direction).

Inside the main body 2, two of the projecting section 3, the control board 6, and the battery 7 are arranged in parallel in the direction of the optical axis of the light (i.e., the x direction), and two of the projecting section 3, the control board 6, and the battery 7 are arranged in parallel in the vertical direction of the projected image projected by the projecting section 3 (i.e., the z direction). As illustrated in FIG. 9, particularly in the first embodiment with the above-described relative positions of the projecting section 3, the control board 6, and the battery 7, the control board 6 is positioned behind the projecting section 3 in the projection direction (i.e., positioned on the negative side in the x direction of the projecting section 3). Further, the battery 7 is positioned below the control board 6 in the vertical direction. That is, similarly to the control board 6, the battery 7 is also positioned behind the projecting section 3 in the projection direction (i.e., positioned on the negative side in the x direction of the projecting section 3).

With the above-described relative positions of the projecting section 3, the control board 6, and the battery 7, at least two of the projecting section 3, the control board 6, and the battery 7 are arranged in parallel in the horizontal direction (i.e., the x direction). Further, in the vertical direction (i.e., the z direction), the remaining one of the projecting section 3, the control board 6, and the battery 7 is disposed so as to overlap one of the two of the projecting section 3, the control board 6, and the battery 7 arranged in parallel in the horizontal direction. With this configuration, the image projector 1 is reduced to a compact size to be easily hand-held.

The support section 8 is also disposed inside the main body 2. The support section 8 serves as a divider that divides at least the battery 7 from the projecting section 3 and the control board 6. As illustrated in FIG. 9, particularly in the first embodiment, the support section 8 is a plate-shaped member with a pair of major surfaces; a first surface 85 facing the negative side of the z direction and a second surface 86 facing the positive side of the z direction. The battery 7 is disposed on the first surface 85 of the support section 8, and the control board 6 and the projecting section 3 are disposed on the second surface 86 of the support section 8 opposite to the first surface 85.

The second surface 86 of the support section 8 includes a projecting section placement face 86a on which the projecting section 3 is disposed. The projecting section placement face 86a is parallel to the optical axis. In the first embodiment, with the projecting section 3 disposed on and fixed to the projecting section placement face 86a, the support section 8 supports the projecting section 3. The projecting section placement face 86a faces a largest surface of the projecting section 3. The projecting section placement face 86a is understood to be a surface closest to the projecting section 3.

The second surface 86 of the support section 8 further includes a control board placement face 86b on which the control board 6 is disposed. The control board placement face 86b faces a largest surface of the control board 6. A surface of the support section 8 opposite to the control board placement face 86b faces a largest surface of the battery 7, and is referred to as a battery placement face 85b. Herein, an expression "a surface facing a certain surface" is used to distinguish the surface facing the certain surface from another surface of the support section 8, and does not deny the possibility that another member exists between the certain surface and the surface facing the certain surface.

The support section 8 thus divides the internal space of the main body 2 to house the battery 7 in a separate room, thereby distancing the projecting section 3 and the control board 6 from the heat generated from the battery 7 to block the heat.

To illustrate the entirety of the image projector 1. FIG. 9 illustrates a configuration forming a part of the image projector 1. In addition to the configuration illustrated in FIG. 9, the image projector 1 also includes configurations for heat radiation, which includes components such as first to fourth heat conductors.

The configurations for heat radiation will be described in detail below.

An example of the configuration for heat radiation around the projecting section 3 will first be described.

Components included in the projecting section 3, such as the light emitting section 31 and the display device 32, act as heat sources that generate heat when driven. If the heat of the projecting section 3 generated by components such as the light emitting section 31 and the display device 32 is transferred to the skin of the operator who holds or operates the image projector 1, the operator may feel discomfort. In the first embodiment, the heat generated by the projecting section 3 is radiated to desired portions of the image projector 1 that are unlikely to frequently touch the skin of the operator, to thereby reduce the discomfort on the operator. In the first embodiment, the expression "heat transfer" mainly refers to the movement of heat, while the expression "heat radiation" mainly refers to the diffusion of heat. That is, "heat transfer" mainly refers to the process of heat movement, while "heat radiation" mainly refers to the result of heat movement.

Figure 10:
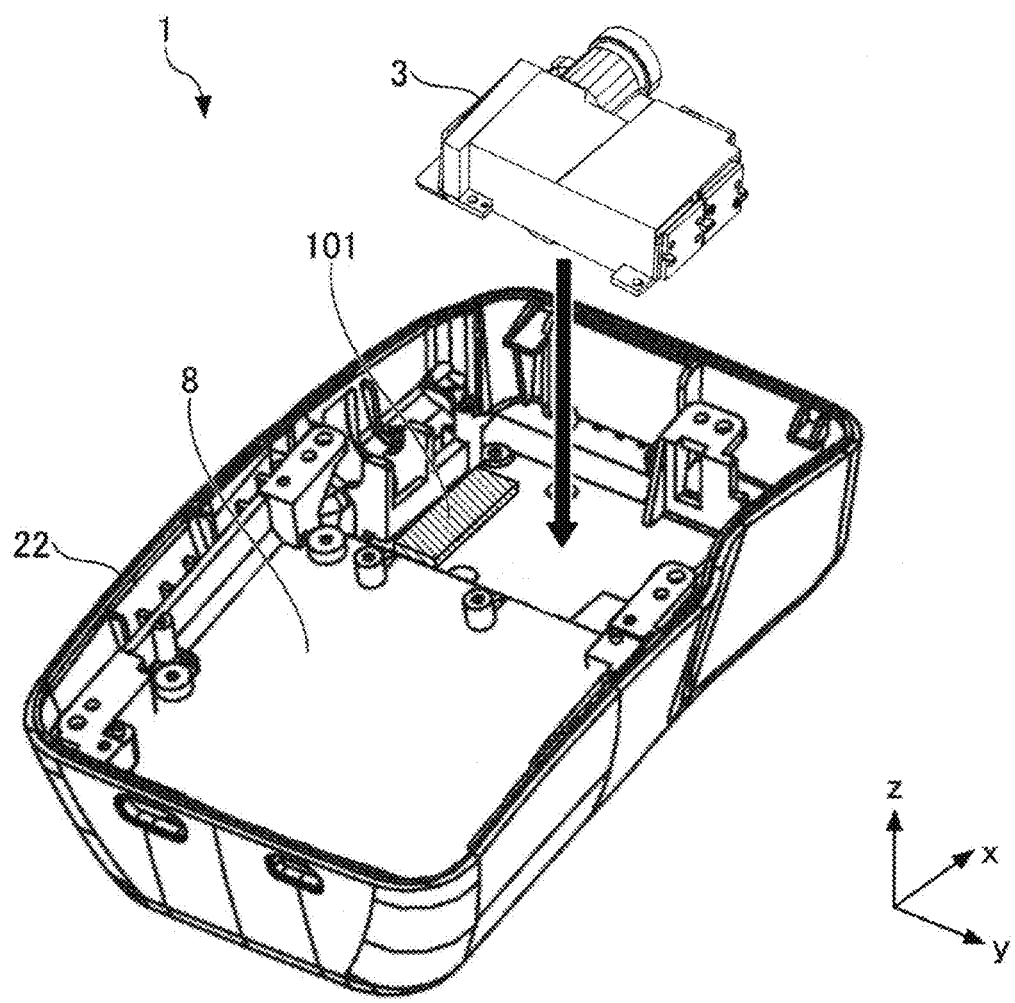
FIG. 10 is an exploded perspective view of the image projector of the first embodiment, illustrating a placement position of a first heat conductor of the image projector.
Figure 11:
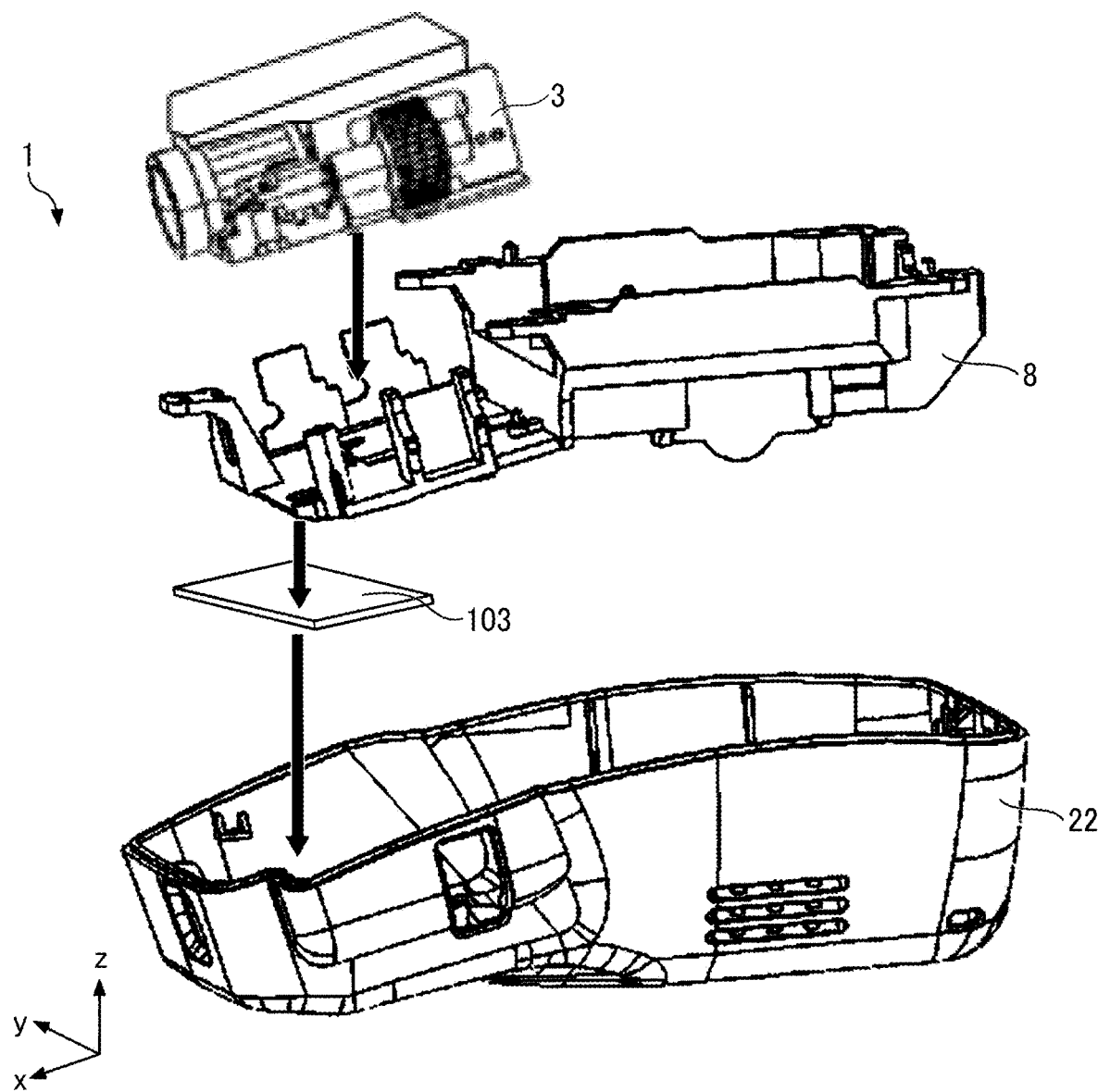
FIG. 11 is an exploded perspective view of the image projector of the first embodiment, illustrating a placement position of a third heat conductor of the image projector.
Figure 12:
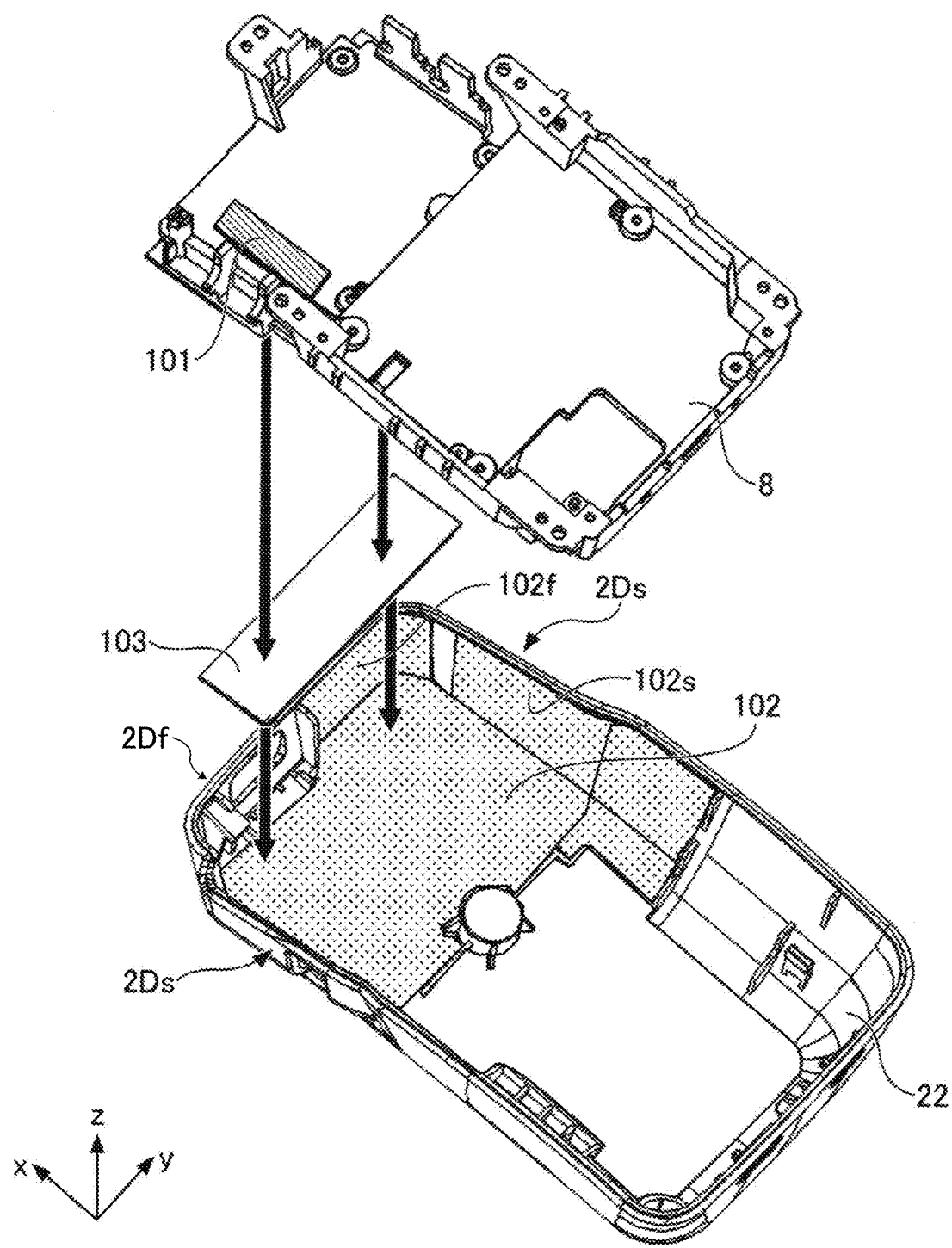
FIG. 12 an exploded perspective view of the image projector of the first embodiment, illustrating respective placement positions of the third heat conductor and a second heat conductor of the image projector.
Figure 13:
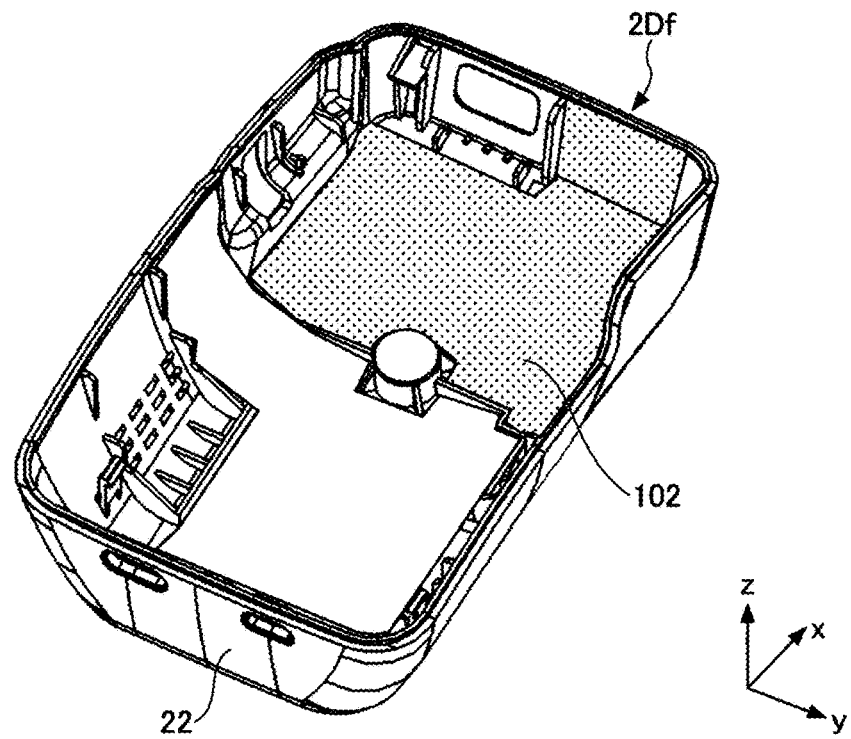
FIG. 13 is a perspective view of the image projector of the first embodiment, illustrating the placement position of the second heat conductor.
Figure 14:
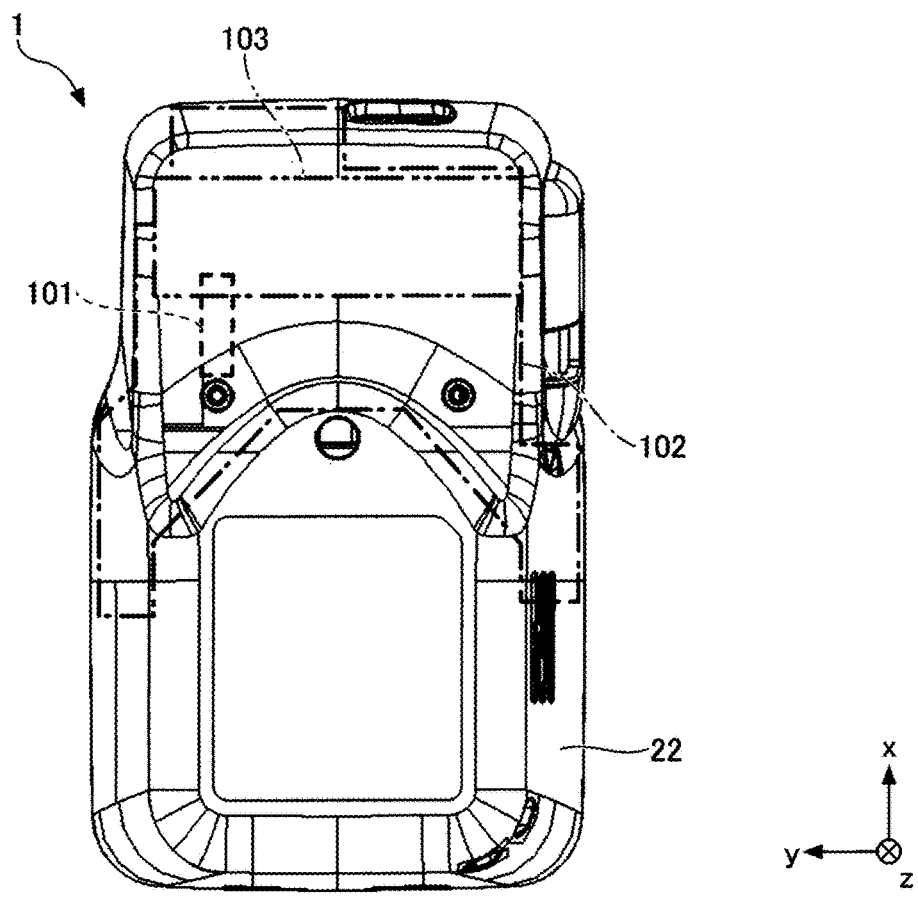
FIG. 14 is a bottom view of the image projector of the first embodiment, illustrating relative positions of the second heat conductor and the third heat conductor.
Figure 15:
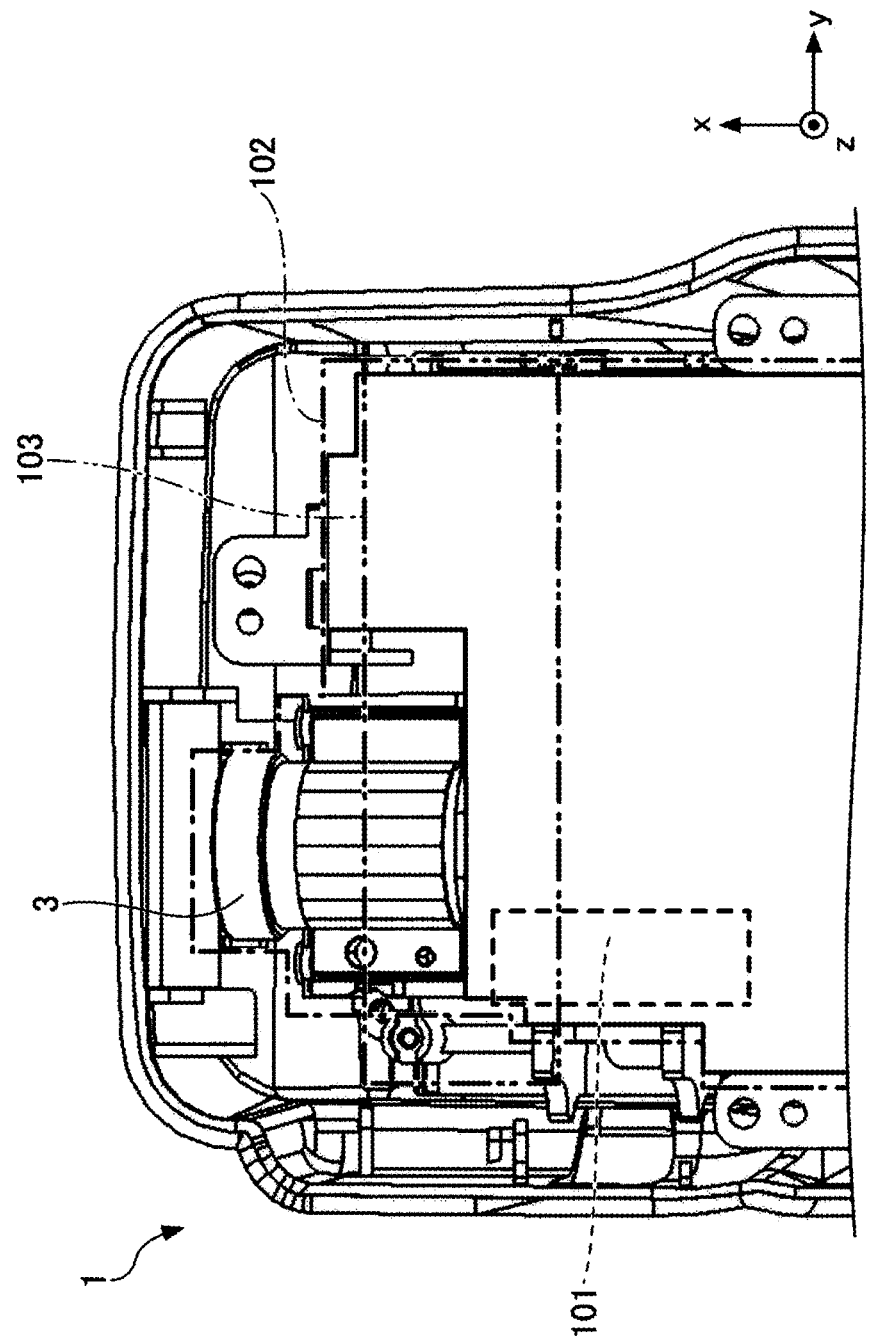
FIG. 15 is a partial enlarged top view of the image projector of the first embodiment, illustrating relative positions of the first heat conductor, the second heat conductor, and the third heat conductor.

FIGS. 10 to 21 are views illustrating examples of the configuration for heat radiation around the projecting section 3. FIG. 10 is an exploded perspective view of the image projector 1, illustrating a placement position of a first heat conductor 101. FIG. 11 is an exploded perspective view of the image projector 1, illustrating a placement position of a third heat conductor 103. FIG. 12 an exploded perspective view of the image projector 1, illustrating respective placement positions of the third heat conductor 103 and a second heat conductor 102. FIG. 13 is a perspective view of the image projector 1, illustrating a placement position of the second heat conductor 102. FIG. 14 is a bottom view of the image projector 1, illustrating relative positions of the second heat conductor 102 and the third heat conductor 103. FIG. 15 is a partial enlarged top view of the image projector 1, illustrating relative positions of the first heat conductor 101, the second heat conductor 102, and the third heat conductor 103.

FIGS. 16 to 21 are partial enlarged perspective views of the image projector 1, illustrating relative positions of the first heat conductor 101 and the projecting section 3. FIGS. 16, 17, 18, 19, 20, and 21 illustrate first, second, third, fourth, fifth, and sixth examples of the relative positions of the first heat conductor 101 and the projecting section 3, respectively.

As illustrated in FIGS. 10 to 21, the image projector 1 includes the first heat conductor 101, the second heat conductor 102, and the third heat conductor 103. FIG. 14 illustrates the first heat conductor 101, the second heat conductor 102, and the third heat conductor 103 inside the image projector 1, as viewed from below the image projector 1 (i.e., from the negative side of the z direction). FIG. 15 illustrates the first heat conductor 101, the second heat conductor 102, and the third heat conductor 103 around the projecting section 3, as viewed from above the image projector 1, with the upper cover 21 removed therefrom. In FIGS. 14 and 15, the first heat conductor 101 is denoted with broken lines, and the second heat conductor 102 is denoted with dash-and-dotted lines. Further, the third heat conductor 103 is denoted with dashed and double-dotted lines.

As illustrated in FIG. 10 and FIGS. 14 to 21, in a plan view of the projecting section placement face 86a (see FIG. 9), the first heat conductor 101 is disposed so as to at least partially overlap the display device 32. In the first embodiment, the plan view of the projecting section placement face 86a refers to a view of the projecting section placement face 86a in an approximate normal direction thereof. With this arrangement, the first heat conductor 101 is positioned near the display device 32, efficiently transferring the heat generated by the display device 32 to the first heat conductor 101. Herein, the approximate normal direction indicates that the normal direction is not limited to the strict definition thereof and may include a direction deviated therefrom within an error range. The same applies to the following description.

As illustrated in FIGS. 14 and 15, in the plan view of the projecting section placement face 86a, the second heat conductor 102 is disposed so as to at least partially overlap the first heat conductor 101. In the example of FIGS. 14 and 15, with the first heat conductor 101 included in the second heat conductor 102, the first heat conductor 101 and the second heat conductor 102 overlap each other. With this arrangement, the first heat conductor 101 is positioned near the second heat conductor 102, efficiently transferring the heat of the first heat conductor 101 to the second heat conductor 102.

Further, in the plan view of the projecting section placement face 86a, the third heat conductor 103 is disposed so as to at least partially overlap each of the first heat conductor 101 and the second heat conductor 102. In the example of FIGS. 14 and 15, a portion of the first heat conductor 101 on the positive side of the x direction overlap the third heat conductor 103. The first heat conductor 101 and the third heat conductor 103 therefore overlap each other. Further, with the third heat conductor 103 included in the second heat conductor 102, the third heat conductor 103 and the second heat conductor 102 overlap each other.

With this arrangement, the first heat conductor 101 is positioned near the third heat conductor 103, efficiently transferring the heat of the first heat conductor 101 to the third heat conductor 103. Further, the third heat conductor 103 is positioned near the second heat conductor 102, efficiently transferring the heat of the third heat conductor 103 to the second heat conductor 102.

Figure 16:
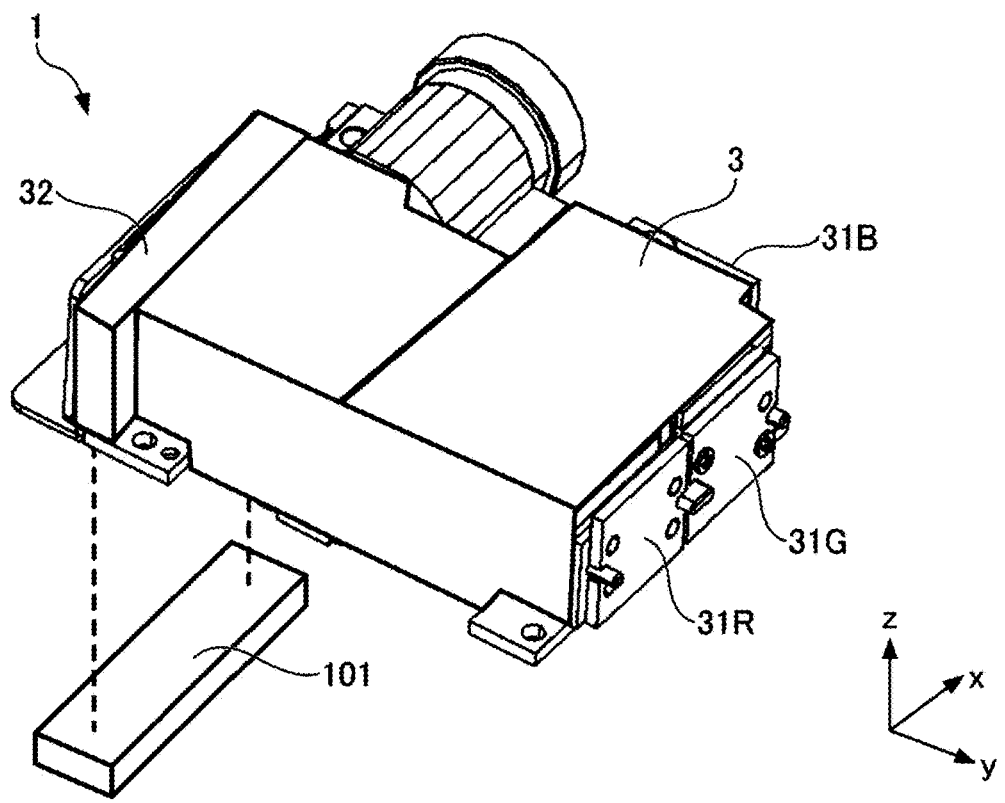
FIG. 16 is a partial enlarged perspective view of the image projector of the first embodiment, illustrating a first example of relative positions of the first heat conductor and a projecting section of the image projector.
Figure 17:
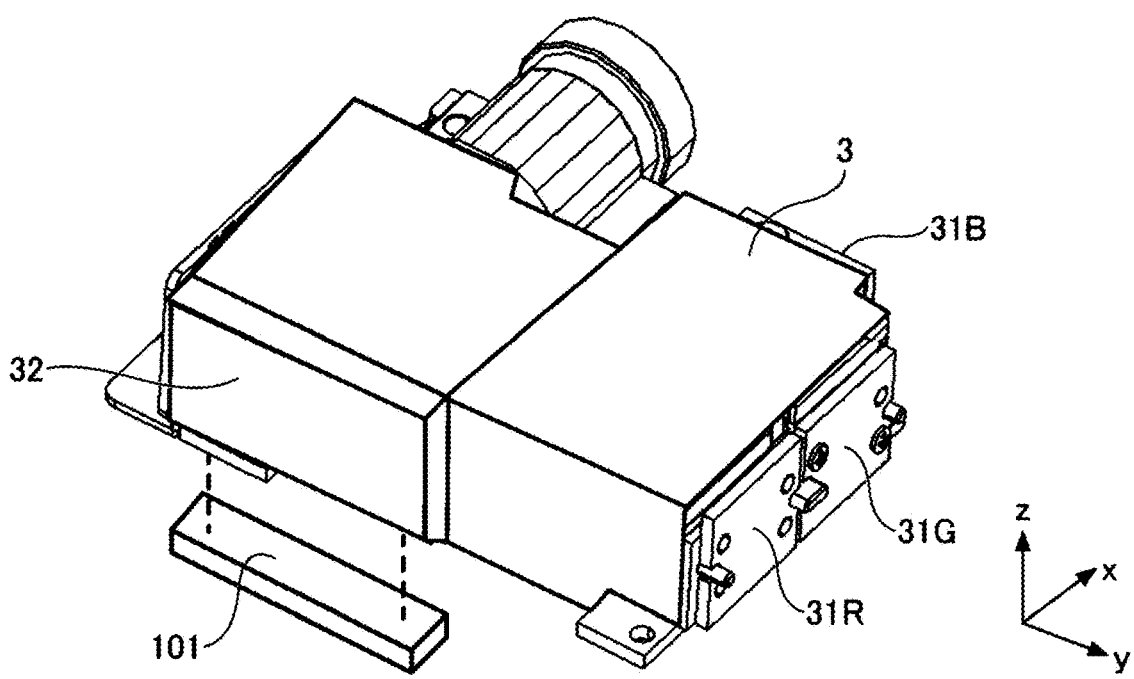
FIG. 17 is a partial enlarged perspective view of the image projector of the first embodiment, illustrating a second example of the relative positions of the first heat conductor and the projecting section.
Figure 18:
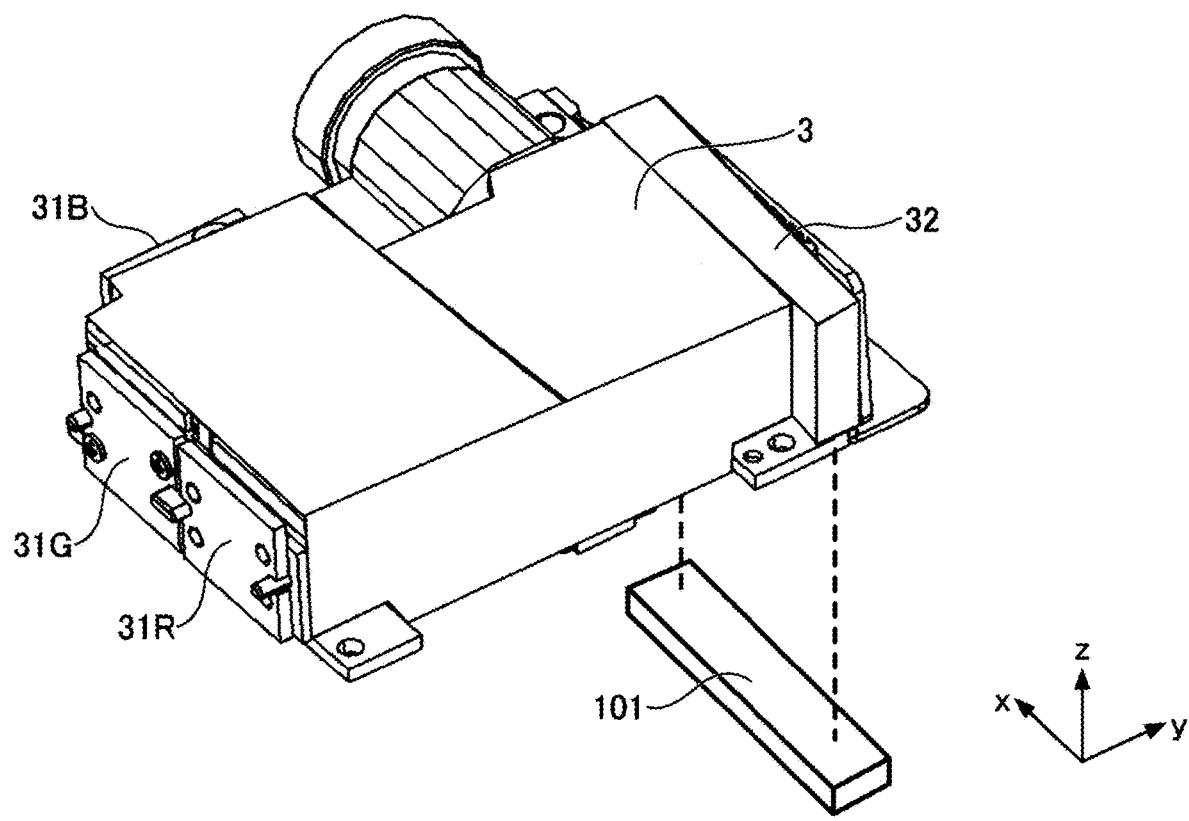
FIG. 18 is a partial enlarged perspective view of the image projector of the first embodiment, illustrating a third example of the relative positions of the first heat conductor and the projecting section.

In the examples of FIGS. 16 to 18, the image projector 1 includes the LEDs 31R, 31G, and 31B on side surface portions of the projecting section 3 as the light emitting section 31 (see FIG. 8). Further, in the examples of FIGS. 19 to 21, the image projector 1 includes a 3-wavelength integrated LED as the light emitting section 31.

The first heat conductor 101 is a member including a material with high thermal conductivity. The first heat conductor 101 is disposed between the projecting section 3 and the support section 8 in the z direction. The first heat conductor 101 is in contact with the support section 8. The projecting section 3 is fixed to the support section 8 via the first heat conductor 101.

In terms of heat transfer efficiency, the thermal conductivity of the first heat conductor 101 is preferably higher than that of the support section 8, and more preferably at least 1.5 watts per meter kelvin [W/m·k]. The first heat conductor 101 preferably includes a graphite sheet. A graphite sheet is graphite as an allotrope of carbon, i.e., black lead, processed into a sheet-shaped member. Further, in terms of heat transfer efficiency, the display device 32 as a heat source and the first heat conductor 101 preferably have substantially the same size. For example, the first heat conductor 101 is arranged to be in contact with a surface of the display device 32 in as much area as possible such that the area of a surface of the first heat conductor 101 in contact with the display device 32 is equal to that of the surface of the display device 32 in contact with the first heat conductor 101 within an error range of ±10%.

The first heat conductor 101, however, is not limited to the sheet-shaped member such as the graphite sheet. The first heat conductor 101 may be a rectangular or cubic member thicker than the sheet-shaped member or a fluid material such as a paste agent, as long as the rectangular or cubic member or the fluid material has high thermal conductivity. The thermal conductivity is measurable with a standard measurement method conforming to the Japanese industrial standards (JIS), for example. The same applies to the third heat conductor 103 and a fourth heat conductor 104, which will be described later.

The first heat conductor 101 preferably includes an elastic body. With the elastic body, the first heat conductor 101 absorbs an external impact on the image projector 1, preventing the damage of the projecting section 3, for example. Further, the first heat conductor 101 preferably has adhesiveness (i.e., tackiness). With adhesiveness, the first heat conductor 101 is usable as an adhesive or bonding member. Consequently, the number of components for fixing the projecting section 3, such as a double-sided tape and screws, is reduced, and an unnecessary increase in the thickness of the first heat conductor 101 is suppressed. For example, an elastic and adhesive graphite sheet having a thickness of approximately 1 mm is usable as the first heat conductor 101.

As illustrated in FIG. 16, in the plan view of the projecting section placement face 86a, the first heat conductor 101 may be disposed so as to at least partially overlap the display device 32. With this arrangement, the first heat conductor 101 is positioned near the display device 32, allowing the heat generated by the display device 32 as a heat source to be efficiently transferred to the first heat conductor 101.

The arrangement of the first heat conductor 101 may be appropriately determined in accordance with the position or orientation of the display device 32. For instance, in the example illustrated in FIG. 17, in which the longitudinal direction of the display device 32 corresponds to the y direction, the display device 32 is positioned on the negative side in the x direction of the projecting section 3. Further, in the example illustrated in FIG. 18, in which the longitudinal direction of the display device 32 corresponds to the x direction, the display device 32 is positioned on the positive side in the y direction of the projecting section 3. The arrangement of the first heat conductor 101 may be determined in accordance with the above-described orientation and position of the display device 32.

Figure 19:
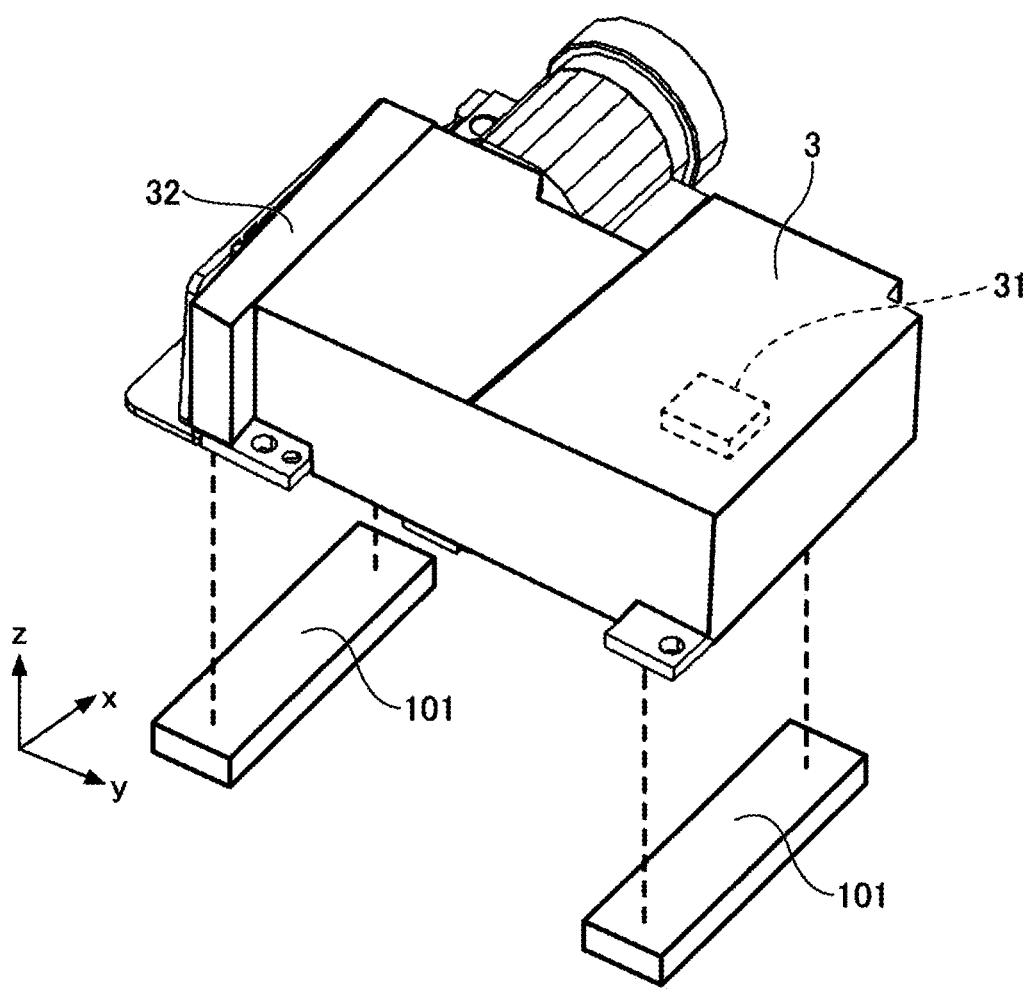
FIG. 19 is a partial enlarged perspective view of the image projector of the first embodiment, illustrating a fourth example of the relative positions of the first heat conductor and the projecting section.

The light emitting section 31 included in the projecting section 3 also acts as a heat source that generates heat when driven. As illustrated in FIG. 19, therefore, in the plan view of the projecting section placement face 86a, the first heat conductor 101 may be disposed to at least partially overlap the light emitting section 31. With this arrangement, the first heat conductor 101 is positioned near the light emitting section 31, allowing the heat generated by the light emitting section 31 to be efficiently transferred to the first heat conductor 101.

The arrangement of the first heat conductor 101 may also be appropriately determined in accordance with the position or orientation of the light emitting section 31. For instance, in the example illustrated in FIG. 20, the light emitting section 31 is positioned on the negative side in the x direction of the projecting section 3. In the example illustrated in FIG. 21, the light emitting section 31 is positioned on the negative side in the y direction of the projecting section 3. The arrangement of the first heat conductor 101 may be determined in accordance with the above-described position of the light emitting section 31.

The size and thickness of the first heat conductor 101 may also be appropriately determined in accordance with the respective sizes and heating values of the projecting section 3, the display device 32, and the light emitting section 31, for example.

Figure 20:
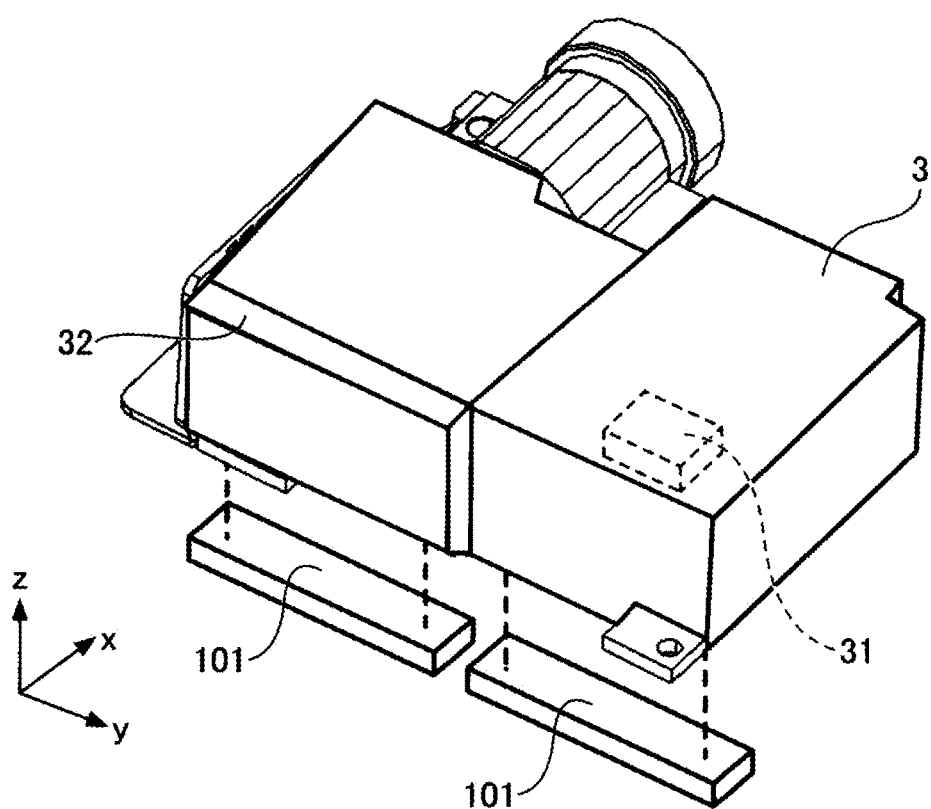
FIG. 20 is a partial enlarged perspective view of the image projector of the first embodiment, illustrating a fifth example of the relative positions of the first heat conductor and the projecting section.
Figure 21:
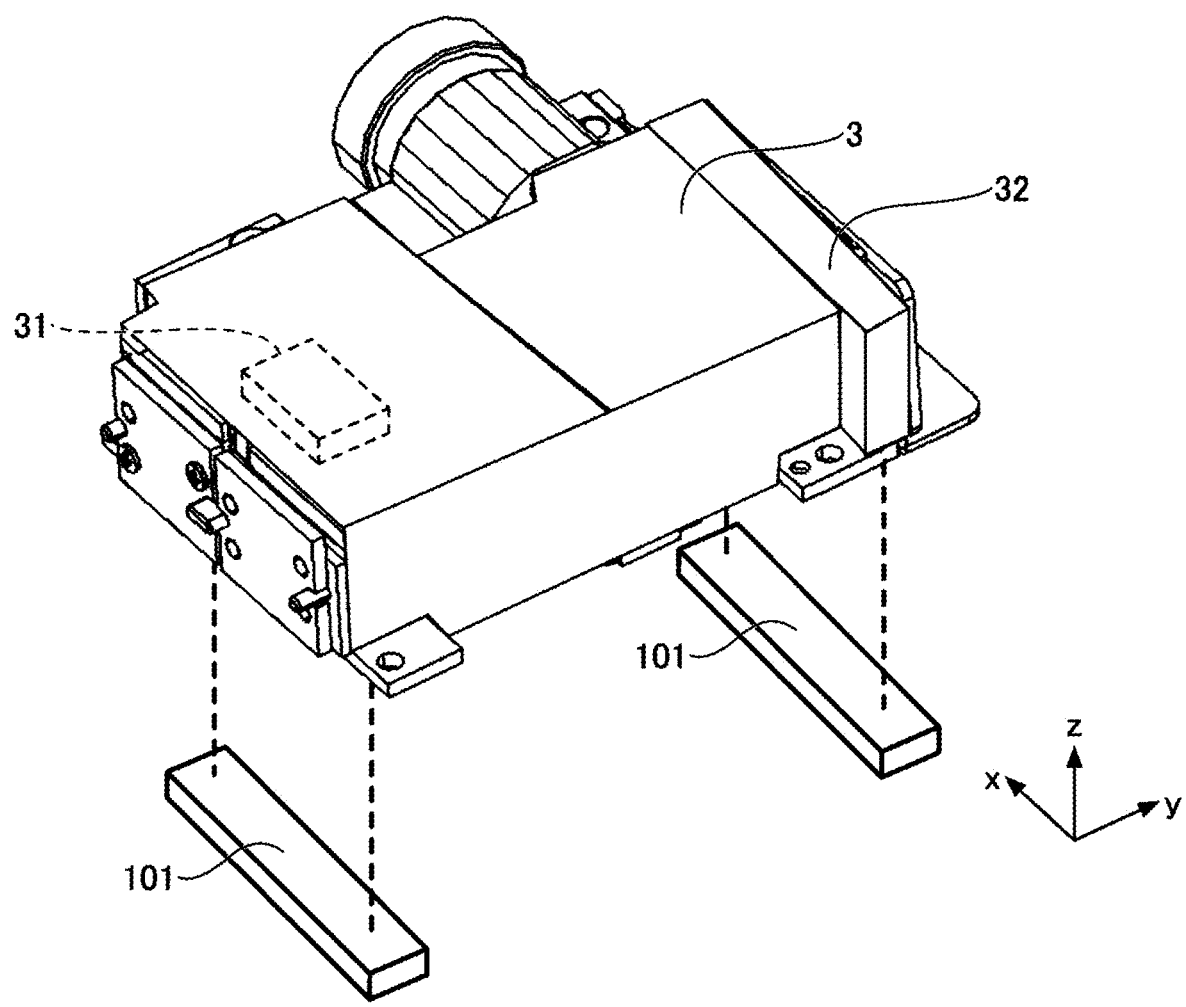
FIG. 21 is a partial enlarged perspective view of the image projector of the first embodiment, illustrating a sixth example of the relative positions of the first heat conductor and the projecting section.

FIGS. 19 to 21 illustrate an exemplary configuration in which respective light emitting sections for the three colors are in contact with the first heat conductor 101. However, the configuration is not limited thereto. For example, the light emitting section for one of the three colors may be in contact with the first heat conductor 101, and the light emitting sections for the remaining two colors may not be in contact with the first heat conductor 101 and may be disposed on a side surface portion of the projecting section 3, as illustrated in FIGS. 16 to 18. Further, each of the light emitting section 31 and the display device 32 is disposed in an area overlapping the third heat conductor 103.

The second heat conductor 102 is a member including a material with high thermal conductivity. The second heat conductor 102 is disposed between the support section 8 and the lower cover 22 in the z direction. The second heat conductor 102 is in contact with the lower cover 22. The support section 8 is fixed to the lower cover 22 via the second heat conductor 102. The second heat conductor 102 may include copper foil, for example. Copper foil has high thermal conductivity, and thus is capable of efficiently transferring the heat inside the image projector 1. Further, copper foil is substantially thin, and thus is placeable in a narrow space. The second heat conductor 102 is fixed to the lower cover 22 with a bonding member, for example.

As illustrated in FIG. 12, the second heat conductor 102 is provided on the inside of the side surface portions 2Ds and the front portion 2Df of the lower cover 22 as well as on the inside of the lower portion 2Dd (see FIG. 4) of the lower cover 22. Herein, the inside refers to a side facing the interior of the image projector 1. In FIG. 12, portions of the second heat conductor 102 provided on the inside of the side surface portions 2Ds are denoted as second heat conductors 102s, and a portion of the second heat conductor 102 provided on the inside of the front portion 2Df is denoted as a second heat conductor 102f.

That is, in a plan view of the side surface portions 2Ds, the second heat conductor 102 is disposed so as to at least partially overlap the side surface portions 2Ds.

The third heat conductor 103 is a member including a material with high thermal conductivity. The third heat conductor 103 is disposed between the support section 8 and the second heat conductor 102 in the z direction. The third heat conductor 103 is arranged to be in contact with each of the support section 8 and the second heat conductor 102. The thermal conductivity of the third heat conductor 103 is preferably higher than that of the support section 8, and more preferably at least 1.5 [W/m·k]. The third heat conductor 103 preferably includes a graphite sheet, for example, similarly to the first heat conductor 101.

Figure 22:
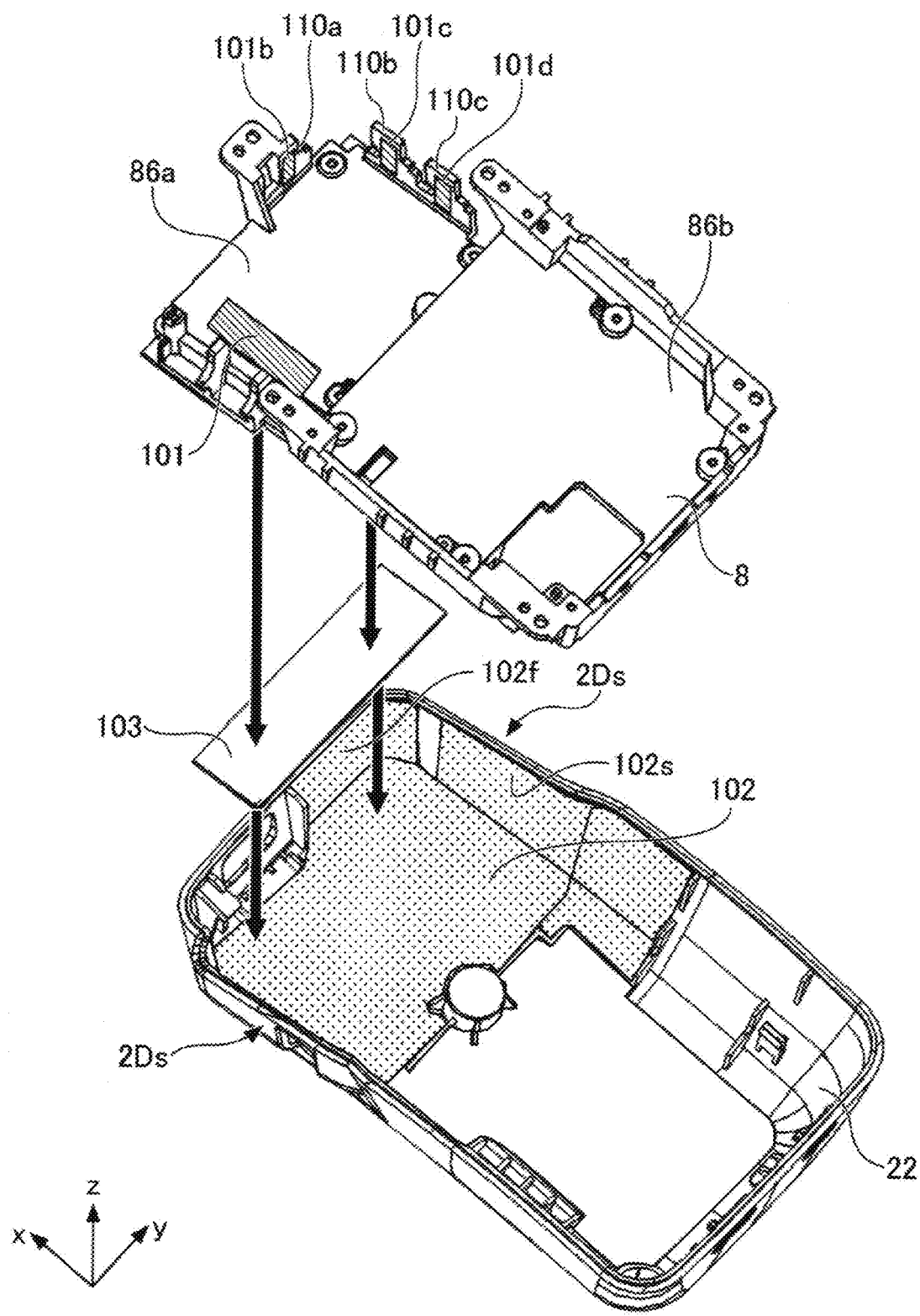
FIG. 22 is an exploded perspective view of the image projector of the first embodiment, illustrating an arrangement example of the first heat conductor according to a modified example of the first embodiment.

FIG. 22 is an exploded perspective view of the image projector 1, illustrating an arrangement example of the first heat conductor 101 according to a modified example of the first embodiment. As illustrated in FIG. 22, the support section 8 includes hooks 110a, 110b, and 110c. Each of the hooks 110a, 110b, and 110c includes an intersecting surface intersecting the projecting section placement face 86a. The hook 110a is formed such that the intersecting surface thereof is paired with and faces the LED 31B. The hook 110b is formed such that the intersecting surface thereof is paired with and faces the LED 31G. The hook 110c is formed such that the intersecting surface thereof is paired with and faces the LED 31R. In the modified example of the first embodiment, the respective intersecting surfaces are substantially perpendicular to the projecting section placement face 86a. In this configuration, the first heat conductor 101 is implemented as first heat conductors 101b, 101c, and 101d in FIG. 22. The first heat conductor 101b is disposed between the LED 31B and the hook 110a paired therewith, and the first heat conductor 101c is disposed between the LED 31G and the hook 110b paired therewith. Further, the first heat conductor 101d is disposed between the LED 31R and the hook 110c paired therewith. Each of the LEDs 31B, 31G, and 31R may be paired with any of the hooks 110a, 110b, and 110c.

The heat radiation action around the projecting section 3 will be described.

In the first embodiment, the heat of components such as the light emitting section 31 and the display device 32 is transferred to the support section 8 via the first heat conductor 101. The heat transferred to the support section 8 is mostly transferred to the third heat conductor 103, which is higher in thermal conductivity than the support section 8. Consequently, the heat transfer to the support section 8 is suppressed. The heat transferred to the third heat conductor 103 is then transferred to the second heat conductor 102.

Since the second heat conductor 102 is provided inside each of the lower portion 2Dd, the side surface portions 2Dd, and the front portion 2Df, the heat transferred to the second heat conductor 102 is radiated to the lower portion 2Dd, the side surface portions 2Dd, and the front portion 2Df of the image projector 1. The heat generated from inside the image projector 1, such as the heat from the display device 32, is thus efficiently radiated via first heat conductor 101, the third heat conductor 103, and the second heat conductor 102.

Further, when the image projector 1 is held by the operator with one hand, i.e., either the right or left hand, the lower portion 2Dd, the side surface portions 2Ds, and the front portion 2Df of the image projector 1 are unlikely to frequently touch the skin of the operator. Even if the heat is transferred to these portions, therefore, the discomfort caused on the operator by the transferred heat is reduced. Further, the heat transfer to the support section 8 is suppressed, reducing the heat radiation to portions of the image projector 1 other than the lower portion 2Dd, the side surface portions 2Ds, and the front portion 2Df and likely to frequently touch the skin of the operator. Consequently, the transfer of the heat generated by the image projector 1 to the operator is suppressed, reducing the discomfort on the operator.

Each of the upper cover 21 and the lower cover 22 includes a contact surface that may contact the skin of the operator. The contact surface is preferably formed as a matt finished surface. Herein, the matt finished surface refers to a surface with fine grainy bumps resembling the skin of pear fruit. Alternatively, the contact surface of each of the upper cover 21 and the lower cover 22 may be an embossed surface. The embossed surface refers to a surface formed through an embossing process. The embossing process is a type of surface processing, specifically a processing method of physically forming a crease pattern on a surface.

With the contact surface formed as a matt finished surface or an embossed surface, the area of contact between the skin of the operator holding the image projector 1 with a hand and the upper cover 21 and the lower cover 22 is reduced. Thereby, the heat generated by the image projector 1 is less likely to be transferred to the skin of the operator, further reducing the discomfort caused on the operator by the heat transfer from the image projector 1.

An example of the configuration for heat radiation around the control board 6 will be described.

During the image projection of the image projector 1, the control board 6 continuously operates. Consequently, the temperature of the control board 6 continues to rise. In the first embodiment, the heat generated by the control board 6 is radiated to portions of the image projector 1 that are unlikely to frequently touch the skin of the operator. Thereby, the discomfort on the operator is reduced, and the heat transfer to components mounted on the control board 6 such as a semiconductor is suppressed, preventing the damage of the components such as the semiconductor.

Figure 23:
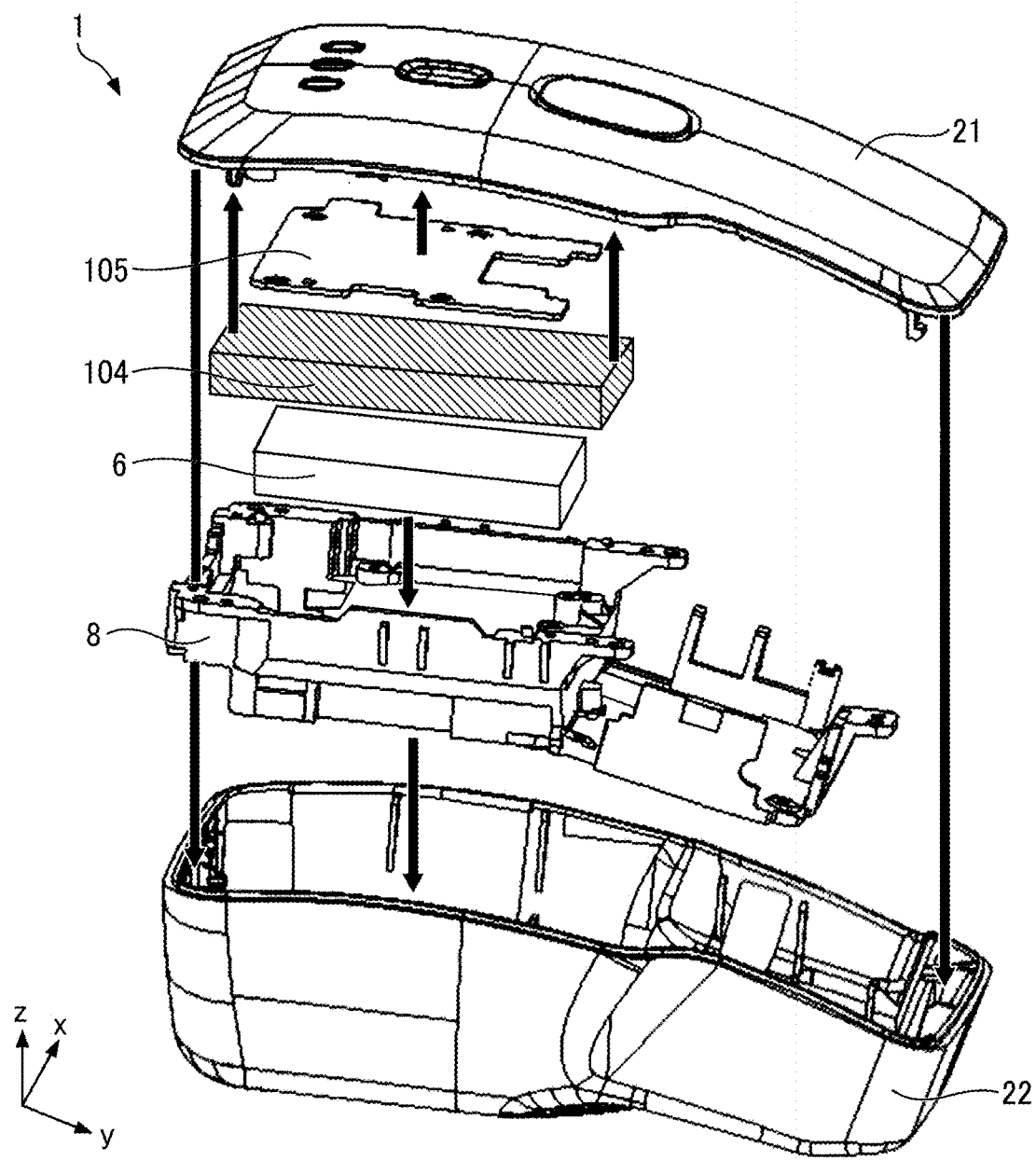
FIG. 23 is an exploded perspective view of the image projector of the first embodiment, illustrating a placement position of a fourth heat conductor of the image projector.
Figure 24:
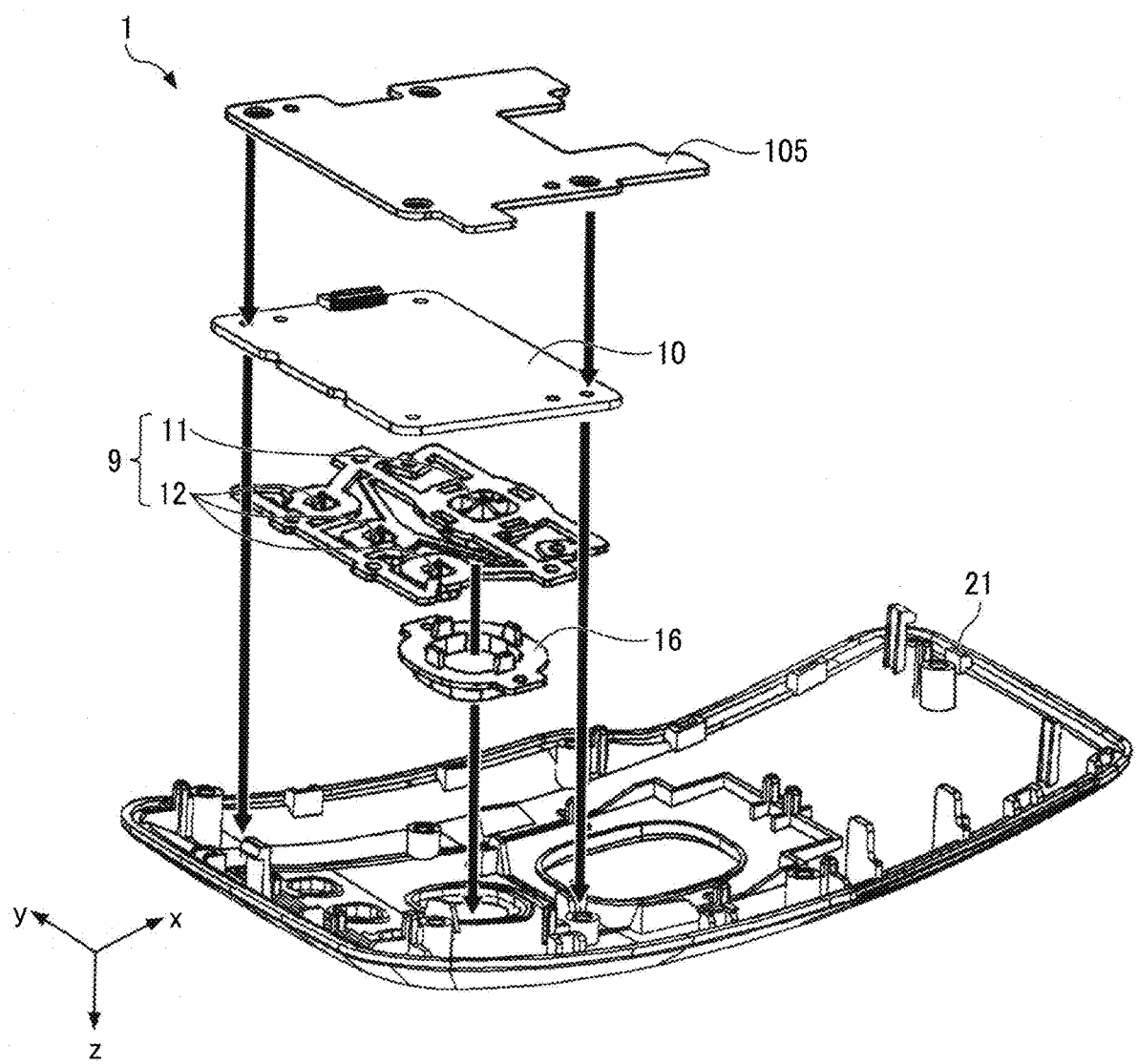
FIG. 24 is an exploded perspective view of the image projector of the first embodiment, illustrating respective placement positions of a first heat insulator and a switch board of the image projector.

FIGS. 23 to 31 are views of the image projector 1, illustrating a configuration for heat radiation around the control board 6. FIG. 23 is an exploded perspective view of the image projector 1, illustrating a placement position of the fourth heat conductor 104. FIG. 24 is an exploded perspective view of the image projector 1, illustrating respective placement positions of a first heat insulator 105 and a switch board 10. FIGS. 25 to 28 are vertical cross-sectional views of the image projector 1, illustrating a configuration of the fourth heat conductor 104 and surrounding components, as viewed from the positive side of the x direction. FIGS. 25, 26, 27, and 28 illustrate first, second, third, and fourth examples of the configuration of the fourth heat conductor 104 and the surrounding components, respectively.

Figure 29:
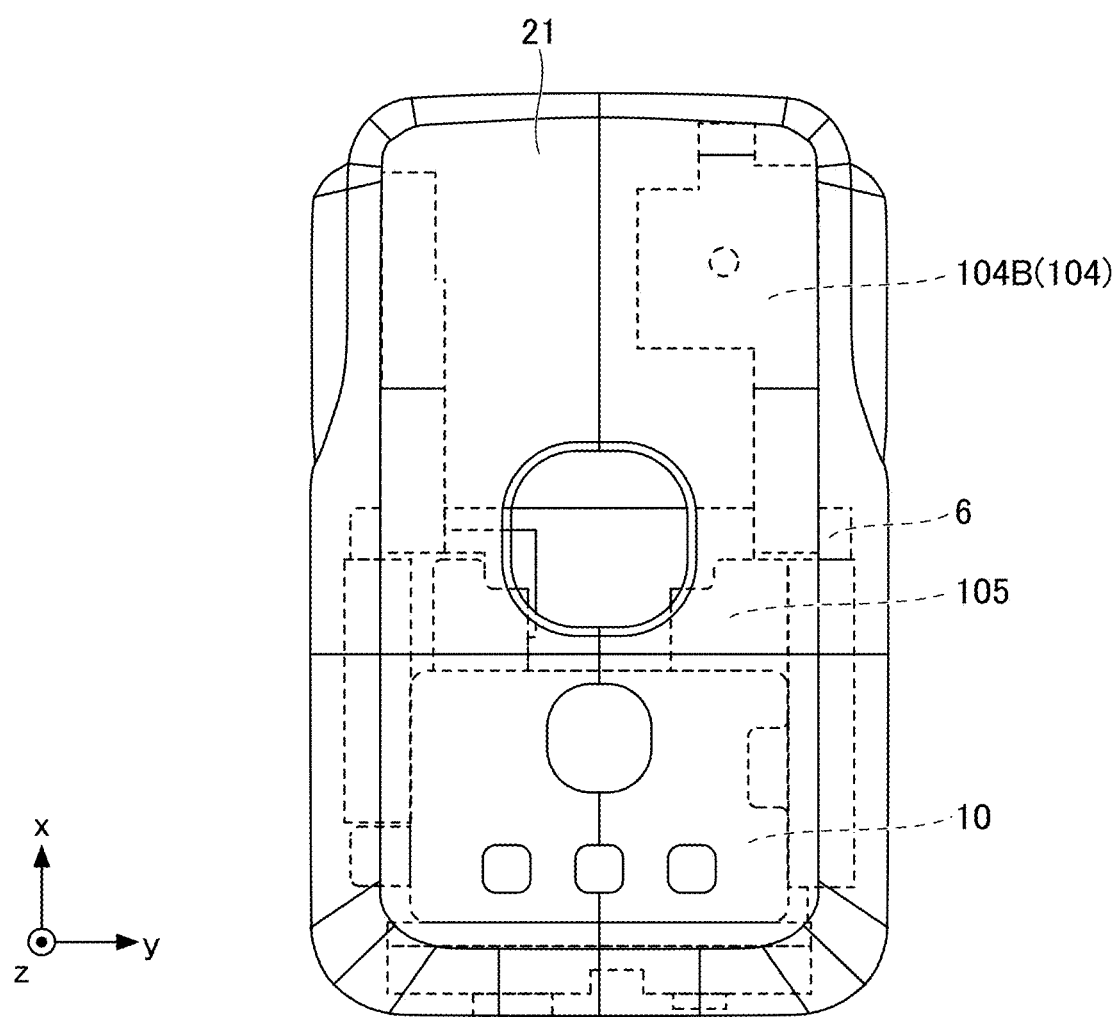
FIG. 29 is a top view of the image projector of the first embodiment, illustrating a control board of the image projector, as viewed from outside an upper cover of the image projector.
Figure 30:
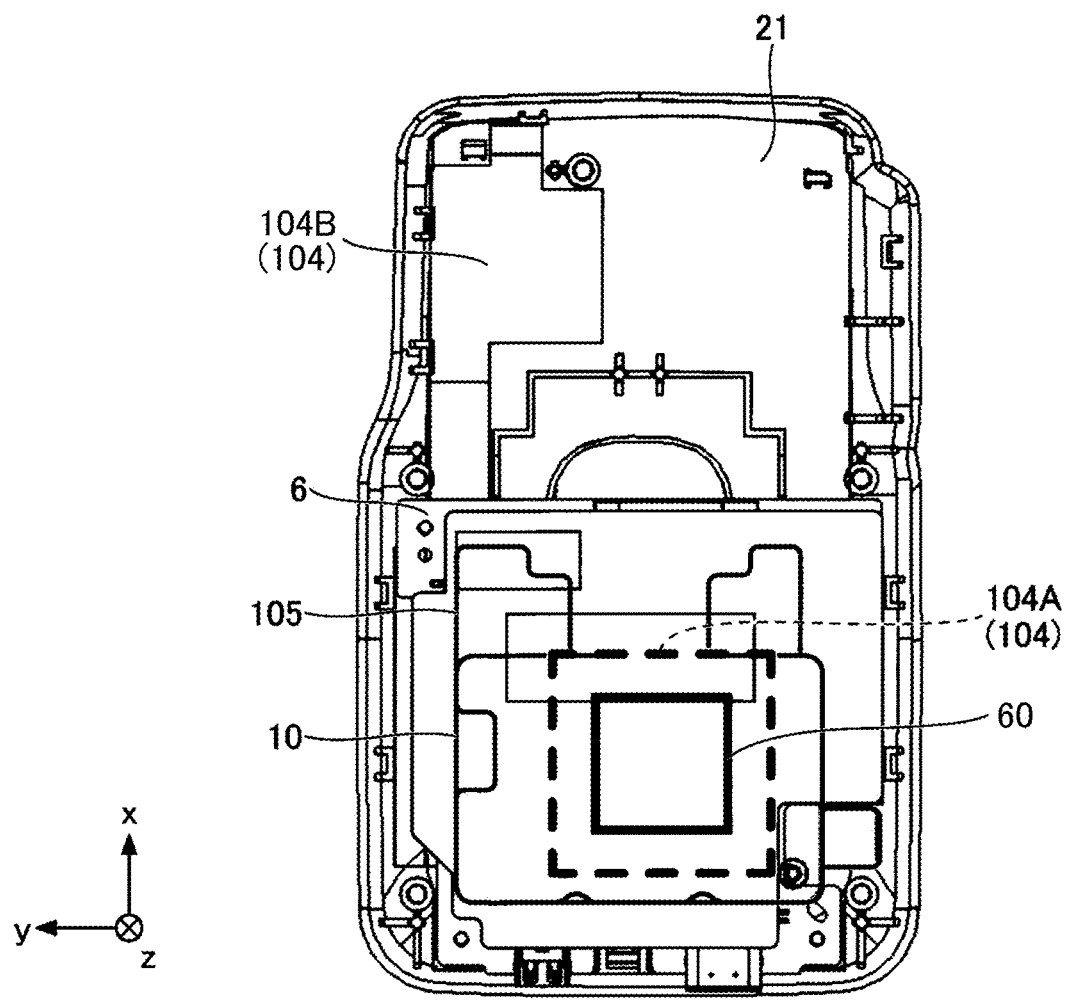
FIG. 30 is a bottom view of the image projector of the first embodiment, illustrating the control board, as viewed inside the upper cover.
Figure 31:
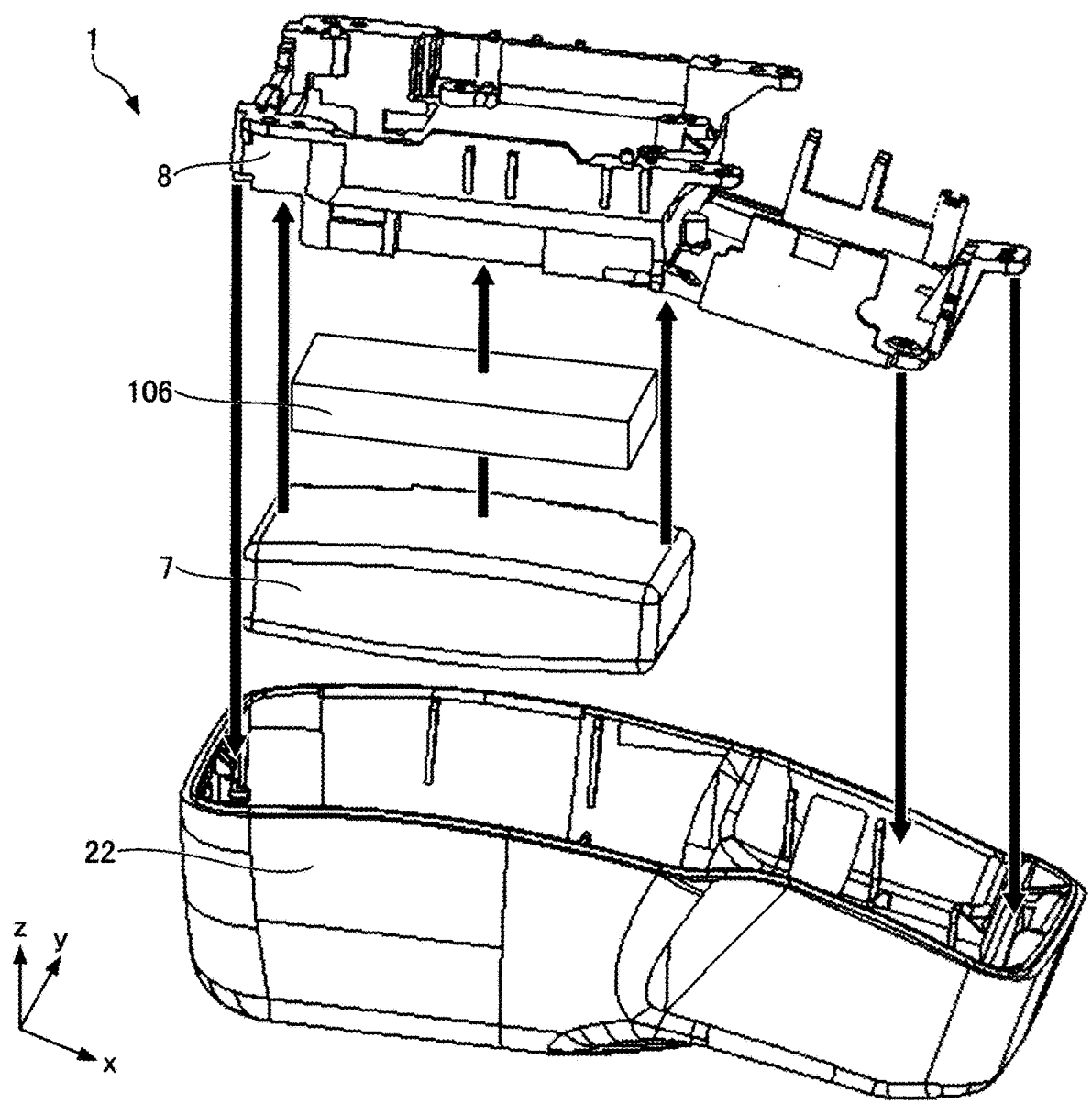
FIG. 31 is an exploded perspective view of the image projector of the first embodiment, illustrating a configuration of a battery of the image projector and surrounding components.

FIG. 29 is a top view of the image projector 1, illustrating the control board 6 as viewed from outside the upper cover 21. FIG. 30 is a bottom view of the image projector 1, illustrating the control board 6 as viewed from inside the upper cover 21. FIG. 29 illustrates the control board 6, the first heat insulator 105, and the switch board 10 attached to the upper cover 21, as viewed from outside the upper cover 21. FIG. 30 illustrates the control board 6, the first heat insulator 105, and the switch board 10 attached to the upper cover 21, as viewed from inside the upper cover 21. FIG. 31 is an exploded perspective view of the image projector 1, illustrating a configuration of the battery 7 and surrounding components.

As illustrated in FIGS. 23 to 31, the image projector 1 includes an operation button set 9, the switch board 10, the fourth heat conductor 104, the first heat insulator 105, and a second heat insulator 106.

The operation button set 9 is an example of an operation section including a plurality of integrally formed operation buttons, such as the projection button 4, the power button 11, and the button set 12. The operation section, however, may include a single operation button. Further, the operation section may include an operation button or switch other than the above-described buttons, for example. An indicator 16 supports the power button 11. The indicator 16 further lights up, for example, to display the status of the main power supply to be visible to the operator.

The switch board 10 is an example of an operation processing section that outputs a signal corresponding to the operation input by the operator, for example, with the operation button set 9. In a plan view of the control board placement face 86b (see FIG. 9), the switch board 10 is disposed so as to at least partially overlap the control board 6. In the first embodiment, the plan view of the control board placement face 86b refers to a view of the control board placement face 86b in an approximate normal direction thereof.

The fourth heat conductor 104 is a member including a material with high thermal conductivity. The fourth heat conductor 104 is disposed between the control board 6 and the upper cover 21 in the z direction. While being in contact with the control board 6, the fourth heat conductor 104 is fixed to the upper cover 21 with screws, for example. The fourth heat conductor 104 includes a graphite sheet or copper foil, for example.

Figure 25:
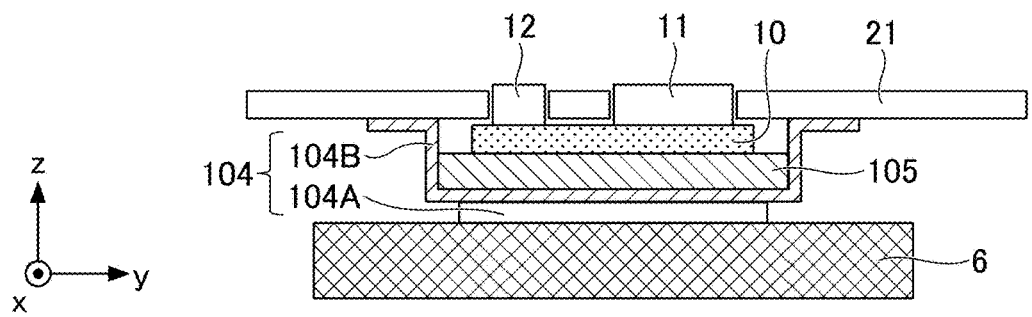
FIG. 25 is a vertical cross-sectional view of the image projector of the first embodiment, illustrating a first example of the configuration of the fourth heat conductor and surrounding components, as viewed from the positive side of the x direction.

As illustrated in FIG. 25, the fourth heat conductor 104 includes a plate-shaped heat conductor 104A and a heat conductor 104B with a bent portion. For example, the plate-shaped heat conductor 104A may be implemented with a graphite sheet, and the heat conductor 104B may be implemented with copper foil. The fourth heat conductor 104 is in contact with each of the control board 6 and the upper cover 21. With this arrangement, the heat generated by the control board 6 is efficiently radiated to the upper cover 21 via the fourth heat conductor 104.

Further, as illustrated in FIGS. 29 and 30, in the plan view of the control board placement face 86b, the fourth heat conductor 104 is attached to the upper cover 21 so as to at least partially overlap the control board 6. With this arrangement, the fourth heat conductor 104 is positioned near the control board 6, efficiently transferring the heat generated by the control board 6 to the fourth heat conductor 104.

A surface of the fourth heat conductor 104 on the positive side of the z direction is in contact with the upper cover 21, and a surface of the fourth heat conductor 104 on the negative side of the z direction of is in contact with the control board 6. The heat generated by the control board 6 is transferred to the upper cover 21 via the fourth heat conductor 104, and then is radiated to the upper cover 21.

The fourth heat conductor 104 preferably includes an elastic body. With the fourth heat conductor 104 including the elastic body, the gap between the fourth heat conductor 104 and the control board 6 is reduced, increasing the area of contact therebetween. Consequently, the heat generated by the control board 6 is efficiently radiated to the upper cover 21. The fourth heat conductor 104 further absorbs an external impact on the image projector 1, preventing the damage of the control board 6.

The first heat insulator 105 is a member including a material with low thermal conductivity. The first heat insulator 105 is disposed between the switch board 10 and the control board 6 in the z direction. With the first heat insulator 105, the heat transfer from the control board 6 to the switch board 10 is suppressed, preventing components included in the switch board 10, such as a semiconductor, from being damaged by heat.

In terms of efficient suppression of the heat transfer from the control board 6 to the switch board 10, in the plan view of the control board placement face 86b, the first heat insulator 105 is preferably disposed so as to at least partially overlap a heat source such as the semiconductor mounted on the control board 6.

The first heat insulator 105 may be implemented with a material with low thermal conductivity, such as a rubber material or a resin material. If it is desirable to increase the rigidity of the first heat insulator 105, the first heat insulator 105 may be implemented with a metal material lower in thermal conductivity than the fourth heat conductor 104, such as aluminum. Further, the first heat insulator 105 may be implemented by attaching an insulator such as an insulating tape to a surface of a member made of a metal material. If it is possible to increase the distance between the switch board 10 and the control board 6, the first heat insulator 105 may be implemented with an air layer.

The second heat insulator 106 is a member including a material with low thermal conductivity. The second heat insulator 106 is arranged to be in contact with each of the battery 7 and the support section 8. Even if the battery 7 is arranged to be in contact with the support section 8, therefore, the second heat insulator 106 suppresses the transfer of the heat of the projecting section 3 and the control board 6 on the support section 8 to the battery 7 via the support section 8, preventing the damage of the battery 7.

The material of the second heat insulator 106 is similar to that of the first heat insulator 105. Further, if it is possible to increase the distance between the support section 8 and the battery 7, the second heat insulator 106 may be implemented with an air layer.

Figure 26:
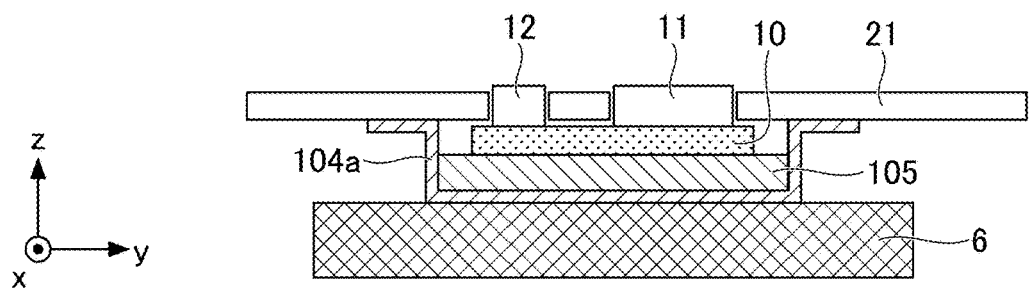
FIG. 26 is a vertical cross-sectional view of the image projector of the first embodiment, illustrating a second example of the configuration of the fourth heat conductor and the surrounding components, as viewed from the positive side of the x direction.

The configuration of the fourth heat conductor 104 and the surrounding components may be modified as appropriate. For example, as illustrated in FIG. 26, the fourth heat conductor 104 may be implemented as a fourth heat conductor 104a. One surface of the fourth heat conductor 104a on the negative side of the z direction is in contact with the control board 6, and the other surface of the fourth heat conductor 104a on the positive side of the z direction is in contact with the upper cover 21. With this configuration, the increase in the thickness of the fourth heat conductor 104 in the z direction is suppressed.

Figure 27:
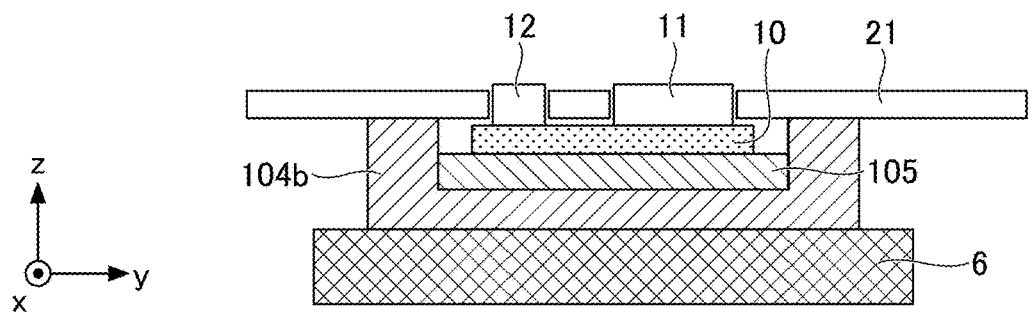
FIG. 27 is a vertical cross-sectional view of the image projector of the first embodiment, illustrating a third example of the configuration of the fourth heat conductor and the surrounding components, as viewed from the positive side of the x direction.
Figure 28:
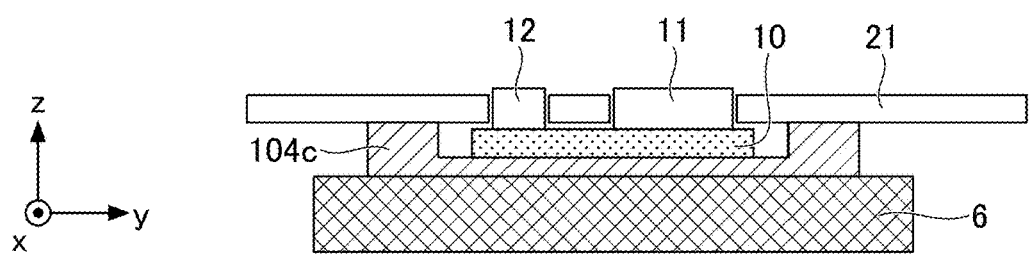
FIG. 28 is a vertical cross-sectional view of the image projector of the first embodiment, illustrating a fourth example of the configuration of the fourth heat conductor and the surrounding components, as viewed from the positive side of the x direction.

Further, as illustrated in FIG. 27, the fourth heat conductor 104 may be implemented as a fourth heat conductor 104b having a recessed shape. If the switch board 10 has sufficient heat resistance to endure the heat generated by the control board 6, the fourth heat conductor 104 may be arranged to be in direct contact with the switch board 10 without the first heat insulator 105.

As described above, the image projector 1 of the first embodiment includes the projecting section 3 that projects an image, the support section 8 that supports the projecting section 3, and the upper cover 21 and the lower cover 22 (i.e., the exterior section) that cover the projecting section 3 and the support section 8. The image projector 1 of the first embodiment further includes the first heat conductor 101 disposed between the projecting section 3 and the support section 8 and the second heat conductor 102 disposed between the support section 8 and the lower cover 22. The projecting section 3 includes the display device 32 (i.e., the image forming section) that forms the image. The projecting section 3 is disposed on the projecting section placement face 86a. In the plan view of the projecting section placement face 86a, the first heat conductor 101 is disposed so as to at least partially overlap the display device 32. With this configuration, the first heat conductor 101 is positioned near the display device 32. According to the image projector 1, therefore, the heat generated from inside the image projector 1 is efficiently radiated via the first heat conductor 101. Further, the heat generated by the display device 32 is transferred to the first heat conductor 101, preventing the heat generated by the image projector 1 from being radiated to other portions of the image projector 1 than a desired portion of the image projector 1.

In the above-described exemplary configuration of the first embodiment, the first heat conductor 101 is in contact with the projecting section 3. The first heat conductor 101, however, may not necessarily be in contact with the projecting section 3. For example, functions similar to the above-described ones are obtainable even with the presence of another member between the first heat conductor 101 and the projecting section 3. In terms of the suppression of heat transfer via another member present between the first heat conductor 101 and the projecting section 3, however, it is preferable that the thermal conductivity of the first heat conductor 101 is higher than that of the another member.

Further, in the first embodiment, in the plan view of the projecting section placement face 86a, the second heat conductor 102 is disposed so as to at least partially overlap the first heat conductor 101. With this configuration, the first heat conductor 101 is positioned near the display device 32, and the second heat conductor 102 is positioned near the first heat conductor 101. According to the image projector 1, therefore, the heat generated from inside the image projector 1 is efficiently radiated via the first heat conductor 101 and the second heat conductor 102. Further, the heat generated by the display device 32 and transferred to the first heat conductor 101 is transferred to the second heat conductor 102, preventing the heat generated by the image projector 1 from being radiated to other portions of the image projector 1 than a desired portion of the image projector 1.

The image projector 1 of the first embodiment further includes the third heat conductor 103 disposed between the support section 8 and the second heat conductor 102. In the plan view of the projecting section placement face 86a, the third heat conductor 103 is disposed so as to at least partially overlap each of the first heat conductor 101 and the second heat conductor 102. With this configuration, the third heat conductor 103 is positioned near the first heat conductor 101. The third heat conductor 103 is also positioned near the second heat conductor 102. According to the image projector 1, therefore, the heat generated from inside the image projector 1 is efficiently radiated via the first heat conductor 101, the second heat conductor 102, and the third heat conductor 103. Further, the heat generated by the display device 32 and transferred to the first heat conductor 101 is transferred to the second heat conductor 102 via the third heat conductor 103, preventing the heat generated by the image projector 1 from being radiated to other portions of the image projector 1 than a desired portion of the image projector 1.

In the above-described exemplary configuration of the first embodiment, the second heat conductor 102 is in contact with the third heat conductor 103. The second heat conductor 102, however, may not necessarily be in contact with the third heat conductor 103. For example, functions similar to the above-described ones are obtainable even with the presence of another member between the second heat conductor 102 and the third heat conductor 103. In terms of the suppression of heat transfer via another member present between the second heat conductor 102 and the third heat conductor 103, however, it is preferable that each of the second heat conductor 102 and the third heat conductor 103 has thermal conductivity higher than that of the another member.

Further, the projecting section 3 includes the light emitting section 31. In the plan view of the projecting section placement face 86a, the first heat conductor 101 may be disposed so as to at least partially overlap the light emitting section 31. With this configuration, the first heat conductor 101 is positioned near the light emitting section 31. According to the image projector 1, therefore, the heat generated from inside the image projector 1 is efficiently radiated via the first heat conductor 101. Further, the heat generated by the light emitting section 31 is transferred to the first heat conductor 101, preventing the heat generated by the image projector 1 from being radiated to other portions of the image projector 1 than a desired portion of the image projector 1.

Further, the image projector 1 of the first embodiment includes the control circuitry 60 that controls operation of the projecting section 3, the control board 6 (i.e., the control board) including the control circuitry 60, and the fourth heat conductor 104 disposed between the control board 6 and the upper cover 21. The fourth heat conductor 104 is in contact with each of the control board 6 and the upper cover 21. With this configuration, the heat generated by the control board 6 is transferred to the upper cover 21 via the fourth heat conductor 104 and radiated to the outside of the image projector 1 via the upper cover 21. Thereby, the image projector 1 is prevented from being damaged by the heat generated by the control board 6.

According to at least one of the above-described examples of the first embodiment, the first heat conductor 101 includes a graphite sheet or an elastic body, or has adhesiveness.

Further, in the image projector 1 of the first embodiment, the battery 7 is disposed on the first surface 85 of the support section 8, and the projecting section 3 and the control board 6 are disposed on the second surface 86 of the support section 8 opposite to the first surface 85. With this configuration, the battery 7 is disposed in a separate space from a space housing the projecting section 3 and the control board 6, which are likely to generate heat, with the support section 8 separating the battery 7 from the projecting section 3 and the control board 6. Thereby, the battery 7 is prevented from being damaged by the heat generated by the projecting section 3 or the control board 6.

Further, the image projector 1 of the first embodiment includes the operation button set 9 (i.e., the operation section), the switch board 10 (i.e., the operation processing section) that outputs, to the control board 6, the signal corresponding to the operation input with the operation button set 9, and the first heat insulator 105 disposed between the switch board 10 and the control board 6. The control board 6 is disposed on the control board placement face 86b of the support section 8. In the plan view of the control board placement face 86b, the switch board 10 is disposed so as to at least partially overlap the control board 6. With this configuration, the heat generated by the control board 6 is prevented from being transferred to the switch board 10, preventing the switch board 10 from being damaged by the generated heat.

Further, in the image projector 1 of the first embodiment, the operation button set 9 (i.e., the operation section) and the switch board 10 (i.e., the operation processing section) are integrally attached to the upper cover 21 (i.e., the exterior section). With this configuration, the operation button set 9 and the switch board 10 are integrated inside the upper cover 21, improving the maintenance performance when removing the operation button set 9 and the switch board 10 from the image projector 1.

Further, the image projector 1 of the first embodiment includes the second heat insulator 106, which is in contact with each of the battery 7 and the support section 8. Thereby, the heat generated by the projecting section 3 and the control board 6 is prevented from being transferred to the battery 7 via the support section 8, preventing the damage of the battery 7.

Further, the image projector 1 of the first embodiment includes the main body 2 that houses the projecting section 3 and the support section 8 in the space covered by the upper cover 21 and the lower cover 22. The main body 2 includes the projection 2D into which a part of the space covered by the upper cover 21 and the lower cover 22 projects. The projection 2D includes the upper portion 2Du (i.e., the first portion), the lower portion 2Dd (i.e., the second portion) facing the upper portion 2Du, and the side surface portions 2Ds (i.e., the third portion) intersecting each of the upper portion 2Du and the lower portion 2Dd. The projecting section 3 is disposed in the projection 2D. In a plan view of the side surface portions 2Ds, the second heat conductor 102 is disposed so as to at least partially overlap the side surface portions 2Ds. With this configuration, the generated heat is radiated to the side surface portions 2Ds, which are unlikely to be frequently touched by the operator during the use of the image projector 1. Consequently, the discomfort on the operator is reduced.

The above-described exemplary configuration of the first embodiment facilitates the heat transfer of the heat generated by the projecting section 3 to each of the lower portion 2Dd, the side surface portions 2Ds, and the front portion 2Df. However, the configuration is not limited thereto. For example, the arrangement of components such as the first heat conductor 101, the second heat conductor 102, the third heat conductor 103, and the fourth heat conductor 104 may be appropriately determined such that the generated heat is radiated to other portions of the image projector 1 that are unlikely to frequently touch the skin of the operator or unlikely to cause the damage of the components of the image projector 1, for example.

An image projector 1a according to a second embodiment of the present invention will be described. The same members or components as those of the first embodiment will be denoted with the same reference numerals to avoid redundant description.

Figure 32:
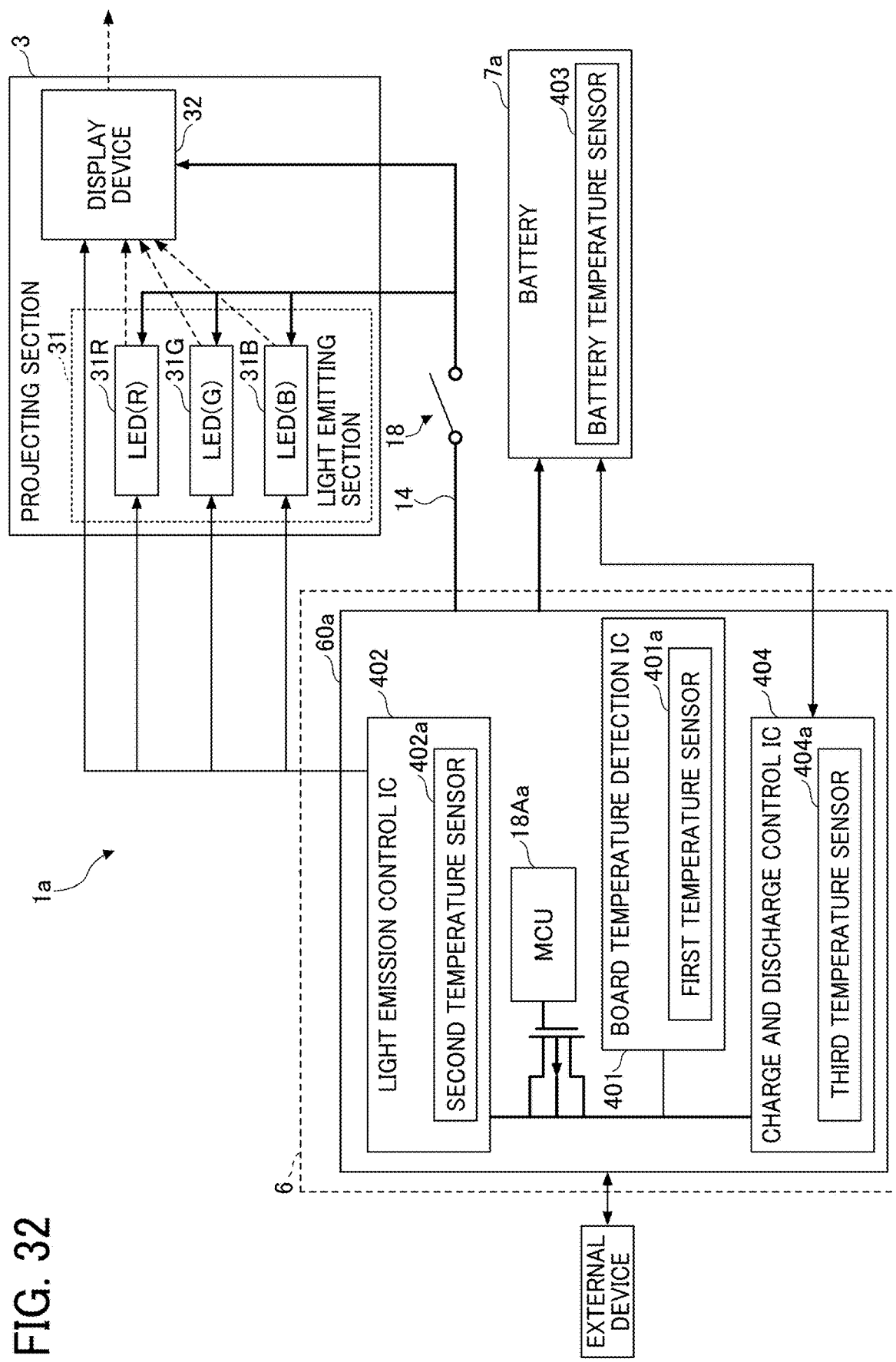
FIG. 32 is a block diagram of an image projector according to a second embodiment of the present invention.

FIG. 32 is a block diagram illustrating an exemplary configuration of the image projector 1a. As illustrated in FIG. 32, the image projector 1a includes control circuitry 60a and a battery 7a. The control circuitry 60a includes a board temperature detection integrated circuit (IC) 401, a light emission control IC 402, a charge and discharge control IC 404, and a micro controller unit (MCU) 18Aa.

The board temperature detection IC 401 is an example of a board temperature detection circuit that outputs temperature information of the control board 6. Specifically, the board temperature detection IC 401 detects the temperature of the control board 6, and outputs the temperature information of the control board 6 to the light emission control IC 402. The board temperature detection IC 401 further includes a first temperature sensor 401a The first temperature sensor 401a is an example of a detection circuit temperature output section that outputs temperature information of the board temperature detection IC 401. The temperatures detected by the board temperature detection IC 401 may include the ambient temperature inside the image projector 1a as well as the temperature of the control board 6. The board temperature detection IC 401 is therefore understood to detect the ambient temperature inside the image projector 1a.

The light emission control IC 402 is an example of a light emission control circuit that controls the light emission of the light emitting section 31. The light emission control IC 402 further includes a second temperature sensor 402a. The second temperature sensor 402a is an example of a light emission temperature output section that outputs temperature information of the light emission control IC 402.

With an increase in the amount of light emitted by the light emitting section 31, the amount of current flowing through the light emission control IC 402 increases, and the temperature of the light emission control IC 402 rises in accordance with the current amount. Further, with the increase in the amount of the light emitted by the light emitting section 31, the temperature of the light emitting section 31 rises, resulting in an increase in the temperature of the display device 32, which forms the projected image based on incident light emitted from the light emitting section 31. For example, when the temperature of the light emission control IC 402 reaches a particular light emission temperature threshold value Th1, the light emission control IC 402 outputs alarm information notifying that the temperature of the light emission control IC 402 has reached the light emission temperature threshold value Th1.

In the exemplary configuration of the second embodiment described here, the second temperature sensor 402a is included in the light emission control IC 402. However, the configuration is not limited thereto. For example, the second temperature sensor 402a may be included in the light emitting section 31 to output temperature information of the light emitting section 31. That is, the second temperature sensor 402a outputs the temperature information of at least one of the light emission control IC 402 or the light emitting section 31 to enable the light emission control IC 402 to control the light emission of the light emitting section 31 based on the temperature information of at least one of the light emission control IC 402 or the light emitting section 31.

The battery 7a includes a battery temperature sensor 403. The battery temperature sensor 403 is an example of a battery temperature output section that outputs temperature information of the battery 7a. The battery temperature sensor 403 may be implemented with, for example, a negative temperature coefficient (NTC) thermistor that detects a change in the temperature inside the battery 7a based on a change in the electrical resistance value of the battery 7a.

The charge and discharge control IC 404 is an example of a charge and discharge control circuit that controls charge and discharge of the battery 7a. Herein, the term "charge" refers to supplying power to the battery 7a from a commercial power supply, for example, to accumulate (i.e., store) the power in the battery 7a. Further, the term "discharge" refers to supplying the power accumulated in the battery 7a to components of the image projector 1a. Under the control of the charge and discharge control IC 404, the battery 7a is charged with a feeding cable such as a universal serial bus (USB)-type C cable and an alternating-current (AC) adaptor, for example, and supplies the accumulated power to the components of the image projector 1a.

The charge and discharge control IC 404 includes a third temperature sensor 404a. The third temperature sensor 404a is an example of a control circuit temperature output section that outputs temperature information of the charge and discharge control IC 404. For example, when the amount of current flowing through the charge and discharge control IC 404 is increased in accordance with the amount of power supplied to the components of the image projector 1a from the battery 7a, the temperature of the charge and discharge control IC 404 rises in accordance with the current amount. The third temperature sensor 404a detects the temperature of the charge and discharge control IC 404, and outputs the detected temperature as the temperature information of the charge and discharge control IC 404.

The charge and discharge control IC 404 controls the discharge of the battery 7a based on the temperature information of the charge and discharge control IC 404. For example, based on the temperature information of the charge and discharge control IC 404, the charge and discharge control IC 404 determines whether or not to discharge the battery 7a. If the temperature of the battery 7a rises to increase the possibility of damaging electronic components included in the image projector 1a, the charge and discharge control IC 404 stops discharging the battery 7a. Further, if the temperature of the charge and discharge control IC 404 is below the freezing point, the charge and discharge control IC 404 stops charging the battery 7a.

Figure 33:
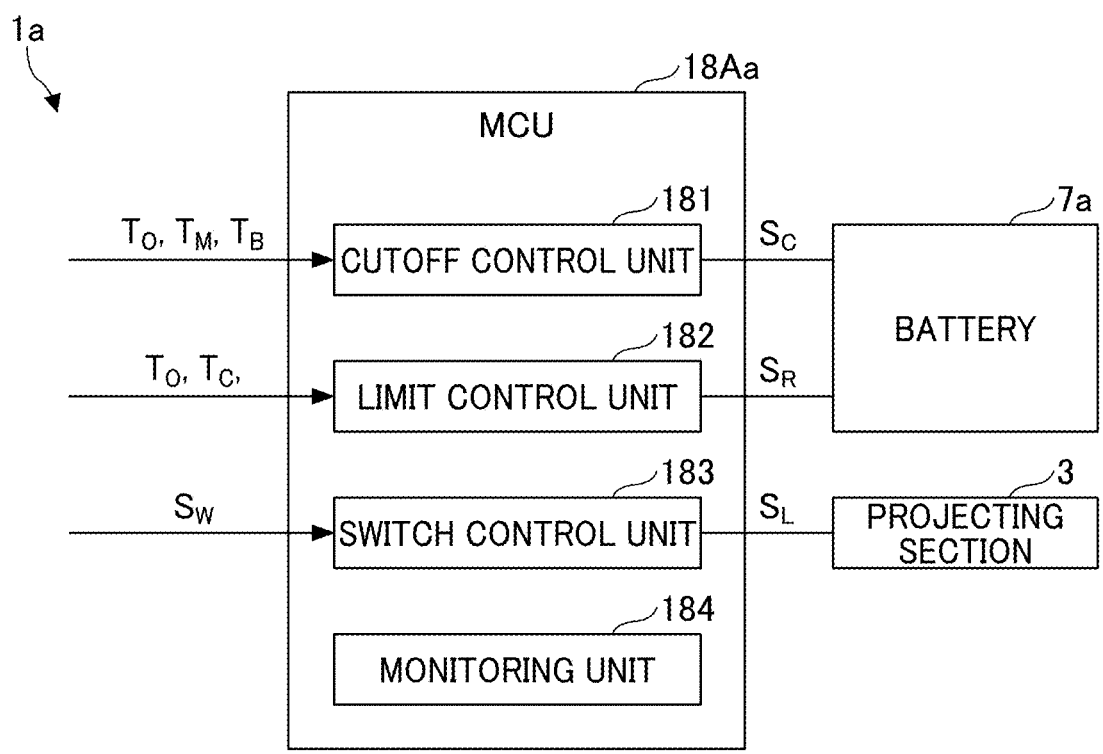
FIG. 33 is a block diagram illustrating a functional configuration of a micro controller unit (MCU) of the image projector of the second embodiment.

FIG. 33 is a block diagram illustrating an example of the functional configuration of the MCU 18Aa. As illustrated in FIG. 33, the MCU 18Aa includes a cutoff control unit 181, a limit control unit 182, a switch control unit 183, and a monitoring unit 184.

The cutoff control unit 181 outputs a control signal Sc based on at least one of a temperature $T_O$ of the light emission control IC 402, a temperature $T_M$ of the control board 6, or a temperature $T_B$ of the battery 7a to execute control to cut off the power supply from the battery 7a.

Specifically, when the image projector 1a is supplied with power, the board temperature detection IC 401, the battery temperature sensor 403, and the second temperature sensor 402a output the information of the temperature $T_M$ of the control board 6, the information of the temperature $T_B$ of the battery 7a, and the information of the temperature $T_O$ of the light emission control IC 402, respectively, with a particular monitoring period S1. If at least one of the following cases occurs in the monitoring period S1: the temperature $T_M$ of the control board 6 reaches a first board temperature threshold value Tm1, the temperature $T_B$ of the battery 7a reaches a battery temperature threshold value Tb1, and the temperature $T_O$ of the light emission control IC 402 reaches the light emission temperature threshold value Th1 and the light emission control IC 402 outputs the alarm, the cutoff control unit 181 executes an overheat protection function to cut off the power supply from the battery 7a.

The limit control unit 182 outputs a control signal SR based on the temperature information of the temperature $T_O$ of the light emission control IC 402 or a temperature $T_C$ of the charge and discharge control IC 404 to execute control to limit part of the power supply from the battery 7a. The state in which part of the power supply from the battery 7a is limited may be a standby state, for example. The standby state refers to the state in which the power supply to components such as the projecting section 3 is stopped while an operating memory is kept in the operating state to reduce power consumption.

The switch control unit 183 outputs a control signal SL to the projecting section 3 based on an operation input signal Sw from the switch 18 to switch between a projection-on state and a projection-off state. The projection-on state refers to the state in which the image is being projected. The projection-off state refers to the state in which the image is not being projected by the projecting section 3.

During the on-state of the switch 18 in a momentary mode, the switch control unit 183 supplies the power to the projecting section 3 via the wire 14 to shift to the projection-on state. The momentary mode refers to the mode in which a device is on while a power button thereof is being pressed.

The monitoring unit 184 has a watchdog timer function of monitoring whether the MCU 18Aa is normally operating. If the MCU 18Aa is not normally operating, the monitoring unit 184 resets the control circuitry 60a after the lapse of a particular resetting time S2. With the control circuitry 60a reset, the image projector 1a is brought into the standby state. If the power button 11 is pressed by the operator in the standby state, the monitoring unit 184 restarts the control circuitry 60a.

An example of operation of the image projector 1a will be described.

An example of control of the charge and discharge control IC 404 will first be described.

Figure 34:
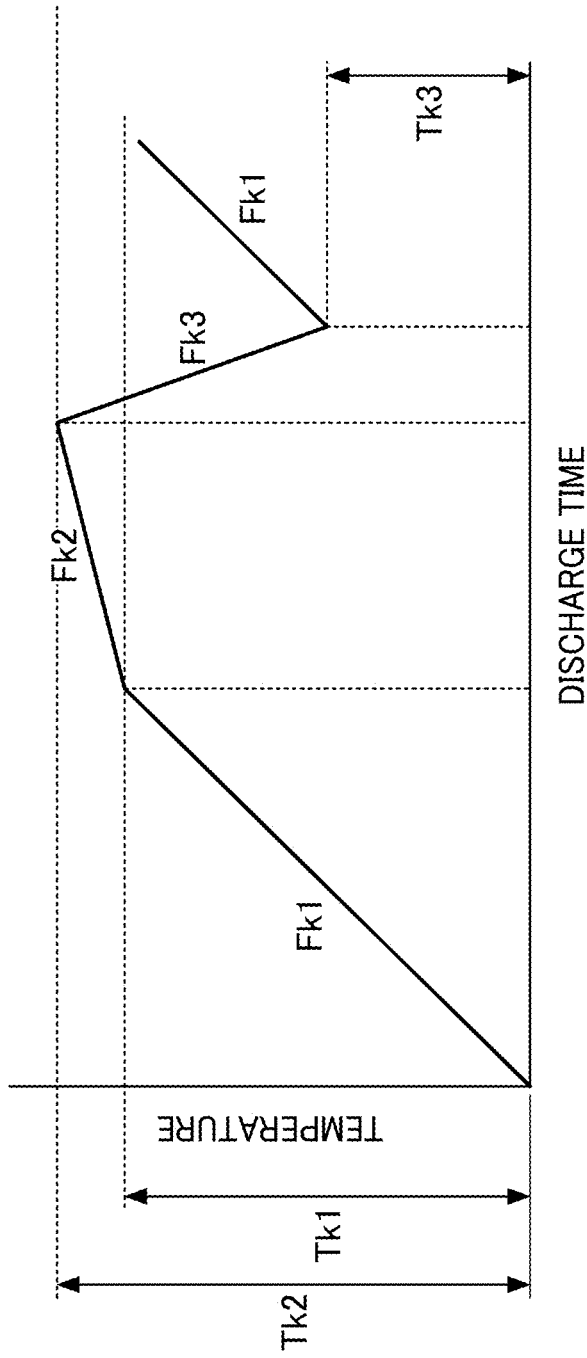
FIG. 34 is a graph illustrating current control with a charge and discharge control integrated circuit (IC) of the image projector of the second embodiment.

FIG. 34 is a graph illustrating an example of current control of the charge and discharge control IC 404. In FIG. 34, the horizontal axis represents the discharge time of the battery 7a, and the vertical axis represents the temperature of the battery 7a.

When the temperature of the battery 7a is below a first battery temperature threshold value Tk1, the charge and discharge control IC 404 discharges the battery 7a such that the amount of current flowing into the components of the image projector 1a from the battery 7a (hereinafter referred to as the component current amount) equals a particular first current amount Fk1. When the temperature of the battery 7a reaches the first battery temperature threshold value Tk1, the charge and discharge control IC 404 discharges the battery 7a such that the component current amount equals a particular second current amount Fk2.

When the temperature of the battery 7a exceeds the first battery temperature threshold value Tk1 and reaches a second battery temperature threshold value Tk2, the charge and discharge control IC 404 stops discharging the battery 7a. When the temperature of the battery 7a exceeds the second battery temperature threshold value Tk2, the charge and discharge control IC 404 adjusts the component current amount to a particular third current amount Fk3 (e.g., 0 [A]) during the period in which the temperature of the battery 7a falls to a third battery temperature threshold value Tk3.

Then, when the temperature of the battery 7a falls to the third battery temperature threshold value Tk3, the charge and discharge control IC 404 discharges the battery 7a such that the component current amount equals the first current amount Fk1 or another particular current amount. When the temperature of the charge and discharge control IC 404 falls below 0 [° C.], however, the charge and discharge control IC 404 stops discharging the battery 7a.

An example of the temperature control of the MCU 18Aa will be described.

Figure 35:
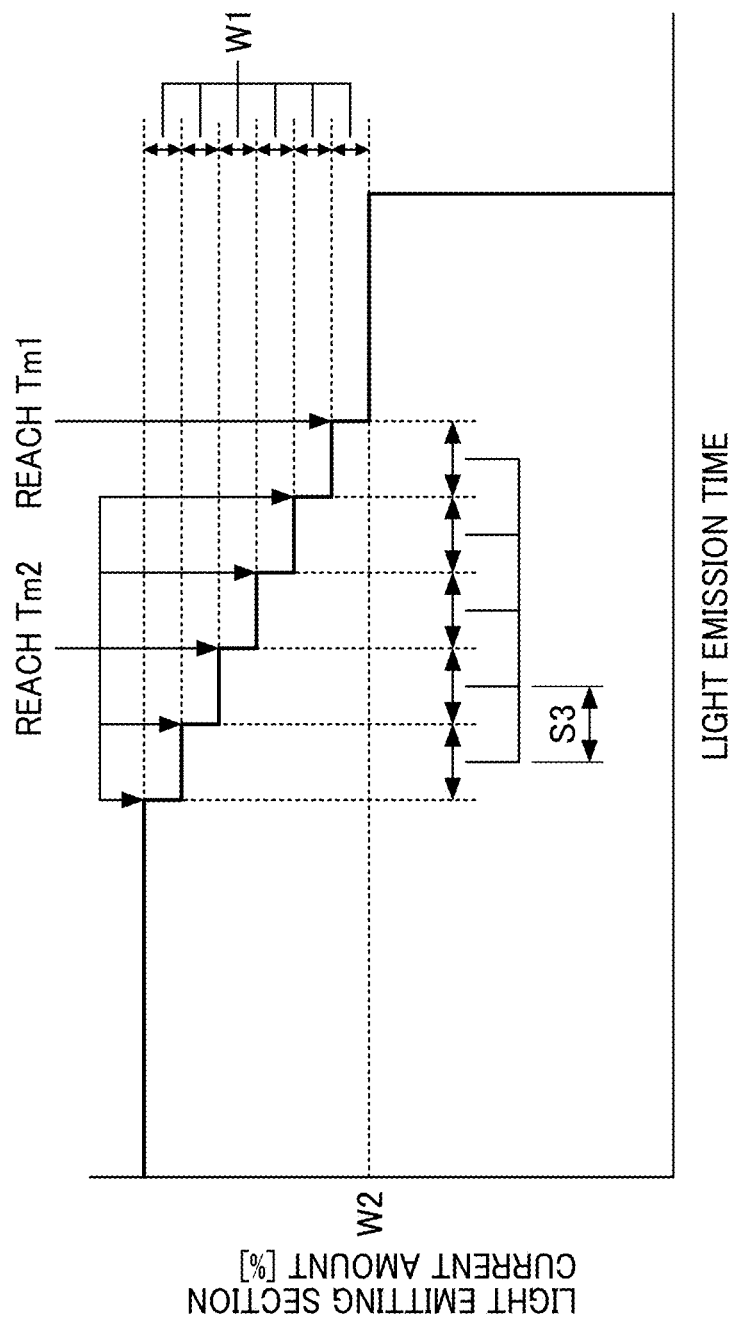
FIG. 35 is a graph illustrating temperature control with the MCU of the image projector of the second embodiment.

FIG. 35 is a graph illustrating an example of the temperature control of the MCU 18Aa. FIG. 35 illustrates control executed by the MCU 18Aa when the temperature $T_M$ of the control board 6 reaches a second board temperature threshold value Tm2 during the light emission of the light emitting section 31 in the projecting section 3. In FIG. 35, the horizontal axis represents the light emission time of the light emitting section 31, and the vertical axis represents the amount of current flowing through the light emitting section 31 (hereinafter referred to as the light emitting section current amount). Herein, the light emitting section current amount represents the ratio 1% of the amount of current flowing through the light emitting section 31 to an initial current amount, i.e., the amount of current flowing through the light emitting section 31 in the image projection of the image projector 1a in an initial state, when the initial current amount is represented as 100 [%].

When the temperature $T_M$ reaches the second board temperature threshold value Tm2, the light emission control IC 402 reduces the light emitting section current amount by a particular current reduction amount W1 to reduce the amount of the light emitted by the light emitting section 31. If the temperature $T_M$ reaches the second board temperature threshold value Tm2 multiple times, the light emission control IC 402 reduces the light emitting section current amount by the current reduction amount W1 each time the temperature $T_M$ reaches the second board temperature threshold value Tm2. Thereby, the temperature inside the image projector 1a is temporarily reduced, preventing the cutoff of the power supply to the image projector 1a with the increase in the temperature, thereby allowing the image projection to continue. The current reduction amount W1 is 10 [%], for example.

If the temperature $T_M$ of the control board 6 is below the second board temperature threshold value Tm2 after the reduction of the light emitting section current amount by the current reduction amount W1, the light emission control IC 402 waits for at least a particular standby time S3 as a condition for the next reduction of the light emitting section current amount by the current reduction amount W1. That is, after having changed the light emission amount of the light emitting section 31 by reducing the light emitting section current amount by the current reduction amount W1, the light emission control IC 402 executes control to keep the light emission amount of the light emitting section 31 unchanged until the lapse of at least the standby time S3. Before the lapse of at least the standby time S3 after the reduction of the light emitting section current amount by the current reduction amount W1, the light emission control IC 402 continues to monitor the temperature $T_M$ without executing the control of reducing the light emitting section current amount by the current reduction amount W1.

If the light emitting section current amount is excessively reduced by repeated control of reducing the light emitting section current amount, the amount of the light emitted by the light emitting section 31 falls below a particular minimum light amount, resulting in insufficient brightness of the projected image and thus a possible reduction in visibility of the projected image.

In the second embodiment, therefore, a minimum current amount W2 corresponding to the minimum brightness of the projected image is previously set to avoid the control of reducing the light emitting section current amount by the current reduction amount W1 when the light emitting section current amount falls below the minimum current amount W2. That is, the light emission control IC 402 executes control to maintain the amount of the light emitted by the light emitting section 31 to at least a minimum light amount. The minimum current amount W2 is 40 [%], for example. The minimum current amount is an example of a particular light amount.

If the image projection continues after the light emitting section current amount falls below the minimum current amount W2 corresponding to the minimum light amount, the temperature inside the image projector 1a may continue to increase. If at least one of the following cases occurs with the increase in the temperature inside the image projector 1a: the temperature $T_M$ of the control board 6 reaches the first board temperature threshold value Tm1, the temperature $T_B$ of the battery 7a reaches the battery temperature threshold value Tb1, and the temperature $T_O$ of the light emission control IC 402 reaches the light emission temperature threshold value Th1 and the light emission control IC 402 outputs the alarm, the cutoff control unit 181 executes the overheat protection function, as described above, to cut off the power supply from the battery 7a.

Further, if the temperature control function of the MCU 18Aa is disabled owing to a failure of the MCU 18Aa, for example, the temperature of the control board 6 rises, increasing the possibility of damaging electronic components mounted on the control board 6, for example. To prevent such a situation, when the temperature of the control board 6 reaches a particular protection temperature, the limit control unit 182 outputs the control signal SR based on the temperature information of the temperature $T_O$ of the light emission control IC 402 or the temperature $T_C$ of the charge and discharge control IC 404, thereby executing the control to limit part of the power supply from the battery 7a.

If the temperature $T_O$ of the light emission control IC 402 reaches the light emission temperature threshold value Th1, the light emission control IC 402 forcefully turns off the light emitting section 31 with an overheat protection device included in the light emission control IC 402. The charge and discharge control IC 404 includes an automatic overheat protection circuit. When the temperature $T_B$ of the battery 7a reaches a particular temperature, the charge and discharge control IC 404 brings the image projector 1a into the standby state with the automatic overheat protection circuit.

Figure 36:
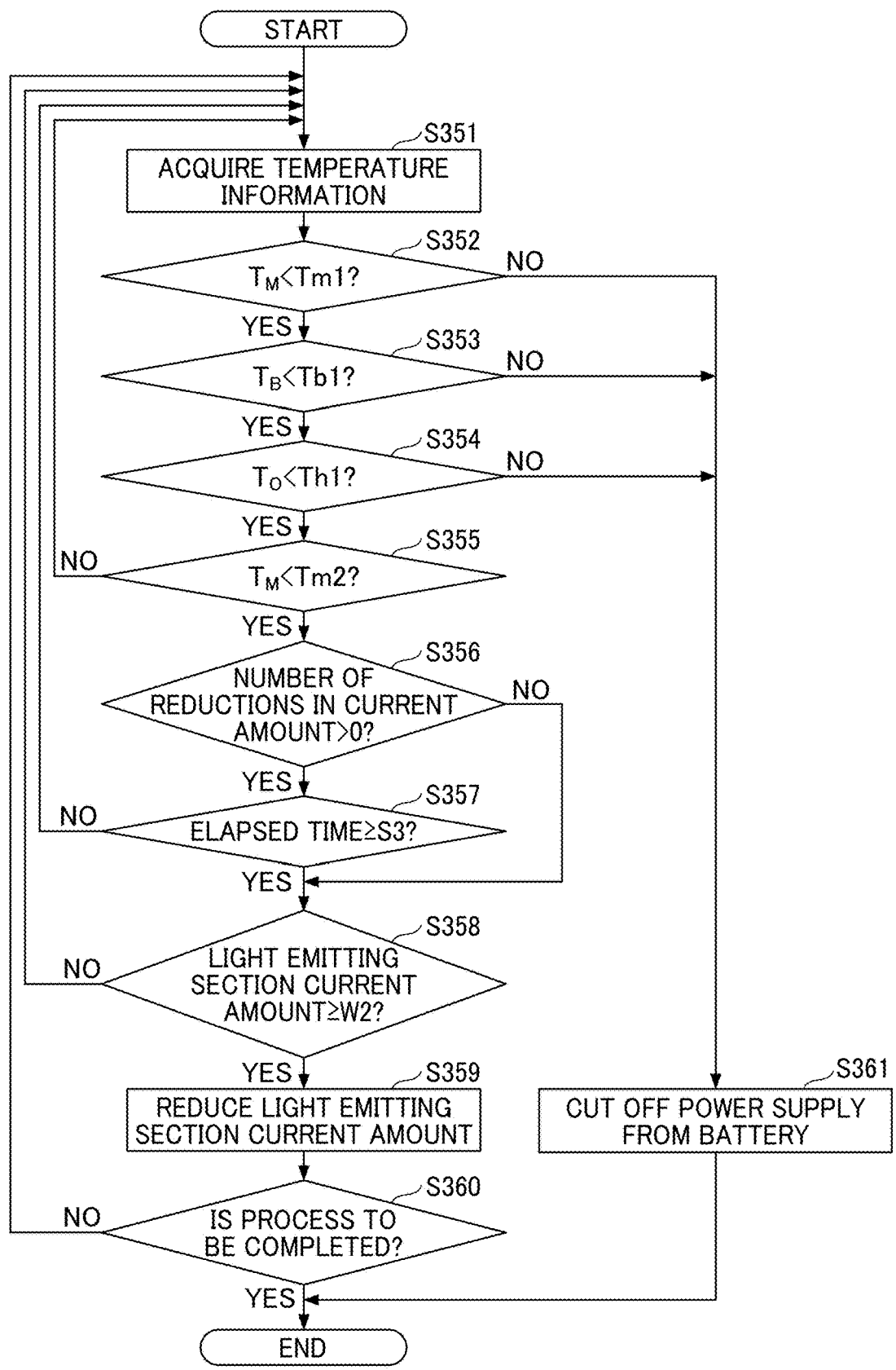
FIG. 36 is a flowchart illustrating a temperature control process with the MCU of the image projector of the second embodiment.

FIG. 36 is a flowchart illustrating an example of the temperature control process of the MCU 18Aa. The temperature control process of FIG. 36 is started by the MCU 18Aa after the components of the image projector 1a are supplied with power from the battery 7a in accordance with the operation input to the power button 11 of the image projector 1a.

At step S351, the MCU 18Aa acquires the temperature information of the temperature $T_M$ of the control board 6, the temperature $T_B$ of the battery 7a, and the temperature $T_O$ of the light emission control IC 402.

At step S352, the MCU 18Aa determines whether the temperature $T_M$ of the control board 6 is lower than the first board temperature threshold value Tm1. If it is determined at step S352 that the temperature $T_M$ of the control board 6 is not lower than the first board temperature threshold value Tm1 (NO at step S352), the MCU 18Aa proceeds to the process of step S361, and the cutoff control unit 181 cuts off the power supply to the components of the image projector 1a from the battery 7a. If it is determined at step S352 that the temperature $T_M$ of the control board 6 is lower than the first board temperature threshold value Tm1 (YES at step S352), the MCU 18Aa proceeds to the process of step S353.

At step S353, the MCU 18Aa determines whether the temperature $T_B$ of the battery 7a is lower than the battery temperature threshold value Tb1. If it is determined at step S353 that the temperature $T_B$ of the battery 7a is not lower than the battery temperature threshold value Tb1 (NO at step S353), the cutoff control unit 181 executes the above-described process of step S361. If it is determined at step S353 that the temperature $T_B$ of the battery 7a is lower than the battery temperature threshold value Tb1 (YES at step S353), the MCU 18Aa proceeds to the process of step S354.

At step S354, the MCU 18Aa determines whether the temperature $T_O$ of the light emission control IC 402 is lower than the light emission temperature threshold value Th1. If it is determined at step S354 that the temperature $T_O$ of the light emission control IC 402 is not lower than the light emission temperature threshold value Th1 (NO at step S354), the light emission control IC 402 outputs the alarm, and the cutoff control unit 181 executes the above-described process of step S361. If it is determined at step S354 that the temperature $T_O$ of the light emission control IC 402 is lower than the light emission temperature threshold value Th1 (YES at step S354), the MCU 18Aa proceeds to the process of step S355.

The order of the processes of steps S352 to S354 may be changed as appropriate. Further, the processes of steps S352 to S354 may be executed in parallel.

At step S355, the MCU 18Aa determines whether the temperature $T_M$ of the control board 6 is lower than the second board temperature threshold value Tm2. If it is determined at step S355 that the temperature $T_M$ of the control board 6 is not lower than the second board temperature threshold value Tm2 (NO at step S355), the MCU 18Aa returns to the process of step S351. If it is determined at step S355 that the temperature $T_M$ of the control board 6 is lower than the second board temperature threshold value Tm2 (YES at step S355), the MCU 18Aa proceeds to the process of step S356.

At step S356, the MCU 18Aa acquires the information of the number of reductions of the light emitting section current amount by the current reduction amount W1 by the light emission control IC 402, and determines whether the acquired number of reductions is greater than zero. For example, the MCU 18Aa may acquire the information of the number of reductions by storing in and reading from the RAM, for example, the information of the number of increments of a counter that is incremented each time the light emitting section current amount is reduced by the current reduction amount W1 by the light emission control IC 402.

If it is determined at step S356 that the number of reductions is not greater than zero (NO at step S356), the MCU 18Aa proceeds to the process of step S358. If it is determined at step S356 that the number of reductions is greater than zero (YES at step S356), the MCU 18Aa proceeds to the process of step S357.

At step S357, the MCU 18Aa acquires elapsed time information of the time elapsed after the last reduction of the light emitting section current amount by the current reduction amount W1 by the light emission control IC 402, and determines whether the elapsed time is equal to or longer than the standby time S3. For example, the MCU 18Aa may acquire the elapsed time information by counting the clock cycles of the CPU after the reduction of the light emitting section current amount by the current reduction amount W1 by the light emission control IC 402.

If it is determined at step S357 that the elapsed time is shorter than the standby time S3 (NO at step S357), the MCU 18Aa returns to the process of step S351. If it is determined at step S357 that the elapsed time is equal to or longer than the standby time S3 (YES at step S357), the MCU 18Aa proceeds to the process of step S358.

The order of the processes of steps S355 to S357 may be changed as appropriate. Further, the processes of steps S355 to S357 may be executed in parallel.

At step S358, the MCU 18Aa determines whether the light emitting section current amount is equal to or greater than the minimum current amount W2. If it is determined at step S358 that the light emitting section current amount is less than the minimum current amount W2 (NO at step S358), the MCU 18Aa returns to the process of step S351. If it is determined at step S358 that the light emitting section current amount is equal to or greater than the minimum current amount W2 (YES at step S358), the MCU 18Aa reduces the light emitting section current amount by the current reduction amount W1 at step S359.

At step S360, the MCU 18Aa determines whether or not to complete the temperature control process. For example, the MCU 18Aa may determine whether or not to complete the temperature control process based on the operation input to the image projector 1a by the operator.

If it is determined at step S360 to complete the temperature control process (YES at step S360), the MCU 18Aa completes the temperature control process. If it is determined at step S360 not to complete the temperature control process (NO at step S360), the MCU 18Aa returns to the process of step S351 to execute again the processes of step S351 and the subsequent steps.

The MCU 18Aa thus executes the temperature control.

As described above, the image projector 1a of the second embodiment includes the control circuitry 60a that controls operation of the projecting section 3, the control board 6 including the control circuitry 60a, and the board temperature detection IC 401 (i.e., the board temperature detection circuit) that outputs the temperature information of the control board 6. Based on the temperature information of the control board 6, the control circuitry 60a controls the amount of the light emitted by the light emitting section 31. With the change in the amount of the light emitted by the light emitting section 31, the heat generation of the control board 6 is suppressed, preventing the components inside the image projector 1a from being damaged by the generated heat.

Further, in the image projector 1a of the second embodiment, after having changed the amount of the light emitted by the light emitting section 31, the control circuitry 60a executes the control to keep the light emission amount of the light emitting section 31 unchanged until the lapse of at least the standby time S3. With this control, sudden darkening of the projected image is prevented, reducing the discomfort on the operator.

The image projector 1a of the second embodiment further includes the first temperature sensor 401a (i.e., the detection circuit temperature output section) that outputs the temperature information of the board temperature detection IC 401. With the first temperature sensor 401a, the image projector 1a is capable of controlling the temperature of the board temperature detection IC 401, providing a measure against an excessive increase in the temperature of the board temperature detection IC 401.

The image projector 1a of the second embodiment further includes the light emission control IC 402 (i.e., the light emission control circuit) and the second temperature sensor 402a (i.e., the light emission temperature output section). The light emission control IC 402 controls the light emission of the light emitting section 31. The second temperature sensor 402a outputs the temperature information of at least one of the light emission control IC 402 or the light emitting section 31. Based on the temperature information of at least one of the light emission control IC 402 or the light emitting section 31, the light emission control IC 402 reduces the amount of the light emitted by the light emitting section 31. Thereby, the increase in the amount of heat generated by the control board 6 is suppressed, preventing the components inside the image projector 1a from being damaged by the heat.

Further, in the image projector 1a of the second embodiment, the light emission control IC 402 executes the control to maintain the amount of the light emitted by the light emitting section 31 to at least a particular light amount. This control avoids a situation in which an excessive reduction in the light emitting section current amount causes insufficient brightness of the projected image and thus reduced visibility of the projected image.

The image projector 1a of the second embodiment further includes the battery 7a, the charge and discharge control IC 404 (i.e., the charge and discharge control circuit), and the third temperature sensor 404a (i.e., the control circuit temperature output section). The charge and discharge control IC 404 controls the charge and discharge of the battery 7a. The third temperature sensor 404a outputs the temperature information of the charge and discharge control IC 404. The image projector 1a is therefore capable of controlling the temperature of the battery 7a based on the temperature of the charge and discharge control IC 404, and extending the life of the battery 7a by suppressing the increase in the temperature of the battery 7a.

Further, in the image projector 1a of the second embodiment, the charge and discharge control IC 404 stops discharging the battery 7a based on the temperature information of the charge and discharge control IC 404. In the case of an abnormal increase in the temperature inside the image projector 1a or a failure of the battery 7a, therefore, a further increase in the temperature of the battery 7a is prevented, or the damage of the components of the image projector 1a by overheating is prevented.

The image projector 1a of the second embodiment further includes the battery temperature sensor 403 (i.e., the battery temperature output section) that outputs the temperature information of the battery 7a. The image projector 1a is therefore capable of controlling the temperature of the battery 7a, providing a measure against the failure of the battery 7a.

Further, in the image projector 1a of the second embodiment, the cutoff control unit 181 executes the control to cut off the power supply from the battery 7a based on the temperature information of at least one of the light emission control IC 402, the control board 6, or the battery 7a. For example, even if one of the second temperature sensor 402a, the board temperature detection IC 401, and the battery temperature sensor 403 fails when the temperature inside the image projector 1a is increased, the cutoff control unit 181 detects the increase in the temperature inside the image projector 1a and stops the operation of the image projector 1a. Consequently, the spread of damage in the image projector 1a is prevented.

Further, in the image projector 1a of the second embodiment, when the temperature of the charge and discharge control IC 404 is equal to or higher than the battery temperature threshold value Tb1, the charge and discharge control IC 404 stops discharging the battery 7a. Thereby, the increase in the temperature of the battery 7a is suppressed, extending the life of the battery 7a.

Further, in the image projector 1a of the second embodiment, when the temperature of the charge and discharge control IC 404 is below the freezing point, the charge and discharge control IC 404 stops charging the battery 7a. Thereby, the failure of the battery 7a due to charging in a low-temperature environment is prevented.

Further, in the image projector 1a of the second embodiment, the limit control unit 182 executes the control to limit part of the power supply from the battery 7a based on the temperature information of the light emission control IC 402 or the charge and discharge control IC 404. Thereby, the increase in the temperature of the image projector 1a is suppressed, preventing the spread of damage in the image projector 1a.

Other functions of the second embodiment than the above-described ones are similar to those described above in the first embodiment. Further, the second embodiment may be combined with the first embodiment.

In the forgoing embodiments, a small hand-held image projector has been described as an example of the image projector. However, the image projector is not limited thereto. The embodiments are also applicable to various other types of image projectors, such as a vertical image projector, a horizontal image projector, and a hanging image projector. Further, the image projector may be referred to as the image projecting device or apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Modifications or alternations of the above-described specific examples of the embodiments by a person skilled in the art are within the scope of the present disclosure, as long as the modifications or alternations include the features of the present disclosure. The elements in each of the specific examples and the arrangements, conditions, and shapes of the elements are not limited to the described ones, and may be modified as appropriate. The combination of the elements in each of the specific examples may be changed as appropriate as long as no technical contradiction arises.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An image projector comprising:
a projecting section configured to project an image, the projecting section including an image forming section configured to form the image;
a support section configured to support the projecting section, the support section including a projecting section placement face on which the projecting section is disposed;
an exterior section configured to cover the projecting section and the support section;
a first heat conductor disposed between the projecting section and the support section, the first heat conductor being disposed so as to at least partially overlap the image forming section in a plan view of the projecting section placement face;
a second heat conductor disposed between the support section and the exterior section;
control circuitry configured to control operation of the projecting section;
a control board including the control circuitry; and
a fourth heat conductor disposed between the control board and the exterior section to be in contact with each of the control board and the exterior section.

2. The image projector of claim 1, wherein;
the second heat conductor is disposed so as to at least partially overlap the first heat conductor in the plan view of the projecting section placement face.

3. The image projector of claim 1, further comprising:
a third heat conductor disposed between the support section and the second heat conductor so as to at least partially overlap each of the first heat conductor and the second heat conductor in the plan view of the projecting section placement face.

4. The image projector of claim 1, wherein:
the projecting section includes a light emitting section, and
the first heat conductor is disposed so as to at least partially overlap the light emitting section in the plan view of the projecting section placement face.

5. The image projector of claim 1, further comprising:
a battery,
wherein the support section includes a first face and a second face opposite to the first face,
wherein the battery is disposed on the first face of the support section, and
wherein the projecting section and the control board are disposed on the second face of the support section.

6. The image projector of claim 1, further comprising:
an operation section;
an operation processing section configured to output, to the control circuitry, a signal corresponding to an operation input with the operation section; and
a first heat insulator disposed between the operation processing section and the control board,
wherein the support section includes a control board placement face on which the control board is disposed, and
wherein the operation processing section is disposed so as to at least partially overlap the control board in a plan view of the control board placement face.

7. The image projector of claim 6, further comprising:
a battery; and
a second heat insulator in contact with each of the battery and the support section.

8. The image projector of claim 1, wherein:
the first heat conductor has a thermal conductivity of at least 1.5 watts per meter kelvin.

9. The image projector of claim 1, wherein:
the second heat conductor includes copper foil.

10. The image projector of claim 1, wherein:
the exterior section includes a contact face formed as at least one of a matte finished face or an embossed face.

11. An image projector, comprising;
a projecting section configured to project an image, the projecting section including an image forming section configured to form the image;
a support section configured to support the projecting section, the support section including a projecting section placement face on which the projecting section is disposed;
an exterior section configured to cover the projecting section and the support section;
a first heat conductor disposed between the projecting section and the support section, the first heat conductor being disposed so as to at least partially overlap the image forming section in a plan view of the projecting section placement face;
a second heat conductor disposed between the support section and the exterior section; and
a main body including the exterior section to house the projecting section and the support section in a space covered by the exterior section,
wherein the main body further includes a projection into which a part of the space covered by the exterior section projects, and in which the projecting section is disposed, wherein the projection includes a first portion, a second portion facing the first portion, and a third portion intersecting each of the first portion and the second portion, and
wherein the second heat conductor is disposed so as to at least partially overlap the third portion in a plan view of the third portion.

12. The image projector of claim 11, wherein:
the first heat conductor has a thermal conductivity of at least 1.5 watts per meter kelvin.

13. An image projector, comprising:
a projecting section configured to project an image, the projecting section including an image forming section configured to form the image;
a support section configured to support the projecting section, the support section including a projecting section placement face on which the projecting section is disposed;
an exterior section configured to cover the projecting section and the support section;
a first heat conductor disposed between the projecting section and the support section, the first heat conductor being disposed so as to at least partially overlap the image forming section in a plan view of the projecting section placement face;
a second heat conductor disposed between the support section and the exterior section;
a control board configured to control operation of the projecting section; and
a board temperature detection circuit configured to output temperature information of the control board,
wherein the projecting section includes a light emitting section, and
wherein based on the temperature information of the control board, the control board controls an amount of light emitted by the light emitting section.

14. The image projector of claim 13, wherein;
the control board executes control to change the amount of the light emitted by the light emitting section and keep the amount of the light unchanged until a particular standby time elapses after the change in the amount of the light.

15. The image projector of claim 13, further comprising:
a detection circuit temperature output section configured to output temperature information of the board temperature detection circuit.

16. The image projector of claim 13, further comprising:
a light emission control circuit configured to control light emission of the light emitting section; and
a light emission temperature output section configured to output temperature information of at least one of the light emission control circuit or the light emitting section,
wherein the light emission control circuit controls the light emission of the light emitting section based on the temperature information of at least one of the light emission control circuit or the light emitting section.

17. The image projector of claim 16, wherein:
the light emission control circuit executes control to maintain the amount of the light emitted by the light emitting section to at least a particular light amount.

18. The image projector of claim 16, further comprising:
a battery;
a charge and discharge control circuit configured to control charge and discharge of the battery; and a control circuit temperature output section configured to output temperature information of the charge and discharge control circuit.

19. The image projector of claim 18, wherein;

based on temperature information of at least one of the light emission control circuit, the control board, or the battery, the control board executes control to cut off power supply from the battery.

20. The image projector of claim 18, wherein:

based on the temperature information of the light emission control circuit or the charge and discharge control circuit, the control board executes control to limit part of power supply from the battery.

* * * * *